(12) United States Patent
Wu et al.

(10) Patent No.: US 10,352,718 B2
(45) Date of Patent: Jul. 16, 2019

(54) DISCOVERING POINTS OF ENTRY TO A LOCATION

(71) Applicant: Apple Inc., Cupertino, CA (US)

(72) Inventors: Xiaoyi Wu, Pleasanton, CA (US); Moran Ben-David, Los Altos, CA (US); Matthew G. Lindsay, San Jose, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 15/275,218

(22) Filed: Sep. 23, 2016

(65) Prior Publication Data

US 2018/0087922 A1    Mar. 29, 2018

(51) Int. Cl.
   *G01C 21/36*   (2006.01)
   *G01C 21/32*   (2006.01)
   *G09B 29/10*   (2006.01)

(52) U.S. Cl.
   CPC ......... *G01C 21/3679* (2013.01); *G01C 21/32* (2013.01); *G09B 29/106* (2013.01)

(58) Field of Classification Search
   CPC ............................ G01C 21/3679; G01C 21/32; G01C 21/3423; G01C 21/206; G09B 29/106
   See application file for complete search history.

(56) References Cited

U.S. PATENT DOCUMENTS

| | | | |
|---|---|---|---|
| 6,374,182 B2* | 4/2002 | Bechtolsheim | G01C 21/3423 340/988 |
| 8,244,454 B2 | 8/2012 | Tertoolen | |
| 8,320,939 B1 | 11/2012 | Vincent | |
| 8,620,586 B2 | 12/2013 | Kurtti et al. | |
| 2013/0297198 A1 | 11/2013 | Velde et al. | |
| 2014/0248900 A1* | 9/2014 | Modica | G01C 21/206 455/456.1 |

FOREIGN PATENT DOCUMENTS

| | | | |
|---|---|---|---|
| EP | 2775260 A1 | 9/2014 | |
| WO | WO-2011155936 A1 * | 12/2011 | ............. G01C 21/32 |
| WO | 2012/019628 A1 | 2/2012 | |

* cited by examiner

*Primary Examiner* — Anne M Antonucci
(74) *Attorney, Agent, or Firm* — Invoke

(57) ABSTRACT

Some embodiments provide a method for identifying one or more entrances to a point of interest or commercial entity (e.g., a shopping mall, a store, a business, etc.) using crowd sourced data received from a set of mobile devices over a specific period of time. The method identifies one or more points of entry to an enclosed area (e.g., a parking garage) associated with a point of interest (POI), as well as one or more points of entry to a building associated with the POI (e.g., a museum). When a user requests for directions to a particular POI, a navigation application of some embodiments uses these points of entry as the real driving and walking destinations when calculating and displaying a route to the particular POI.

21 Claims, 12 Drawing Sheets

DISCOVERING POINTS OF ENTRY TO A LOCATION

BACKGROUND

Current mapping and navigation applications allow users to browse maps and receive route directions to requested destinations. When a user requests for directions to a particular address, a typical navigation application provides navigation instructions up to a final point on a street or alley close to the requested address. This final point is often created by moving the centroid location or other representative location of the destination to the nearest location on the street. Providing navigation instructions this way works well for most residential addresses where one can simply park in front of a house on the street and walk to the front door of the house. However, for most commercial entities (e.g., commercial buildings, shopping malls, businesses, stores, schools, etc.), a parking garage associated with the commercial entity is not often right next to the commercial entity. For example, an entry to a parking lot of a commercial structure is often some distance away from the structure, or even worse, on a side street, which cannot be easily seen from the final point provided by a navigation application. Similarly, the entrance(s) to a commercial structure might not be easily found from a parking garage, once one parks his/her vehicle in the garage.

BRIEF SUMMARY

Some embodiments provide a method for identifying one or more points of entry to and/or exit points from a point of interest (POI) using crowd sourced data received from a set of mobile devices over a specific period of time. The POI, in some embodiments, includes any type of a commercial entity (e.g., a shopping mall, a store, a business, etc.). The method of some embodiments identifies one or more vehicle points of entry to an enclosed area (e.g., a parking garage) associated with a point of interest, as well as one or more exit points from the enclosed area. The method also identifies one or more points of entry to a building associated with the POI (e.g., one or more doors to a museum).

When a user requests for directions to a particular POI in a navigation application, the method provides these points of entry to the application as the real driving and walking destinations when calculating a route to the particular POI. Specifically, the navigation application generates a set of navigation instructions for the requested POI, which includes both driving instructions and walking instructions. The driving instructions guide the user to a vehicle point of entry (i.e., a driving destination of the trip) and the walking instructions guide the user from where the vehicle is parked to an entrance of a building corresponding to the requested POI (i.e., the ultimate destination of the trip).

In some embodiments, the method is implemented by a harvesting server or service that generates a database storing all of the identified entry/exit points data (along with other map data). The entry/exit points data generated by the harvesting server may be used by a set of map servers (e.g., to calculate routes including these entry points), and provided with routes to different map and navigation applications (e.g., to display the entry/exit points as a juncture at which a maneuver is required and/or provide directions to the entry/exit points, etc.). The harvesting service of some embodiments generates the entry points data for different commercial entities and POIs based on (1) public roads network data, (2) commercial parcels data (i.e., commercial plots of land), (3) building footprints data, and (4) probe traces that each tracks a set of location data received from a mobile device (e.g., a cell phone, a portable car navigator, a laptop, a wearable computer such as a smart watch, a tablet, etc.).

The public roads network, building footprints, and commercial parcels are obtainable from third-party vendors in some embodiments. The probe traces (i.e., collected location data that tracks a driving/walking path of a device), in some embodiments, are passively crowd sourced from mobile devices. That is, each mobile device stores location data collected by a global positioning system (GPS) receiver and other sensors (e.g., an accelerometer, a pedometer, a barometer, etc.) of the device locally, when the GPS receiver is enabled on the device.

Each mobile device transmits the collected information (e.g., once a Wi-Fi connection is detected, occurrence of a certain event, etc.) to a harvesting server or service passively in some embodiments. The collected data, in some embodiments, is transmitted to the harvesting server anonymously. That is, the harvesting server will not be informed of the identification of the user or device, from which the data is received. In some other embodiments, the identification of the users may or may not be included in the data sent to the harvesting servers, depending on the authorizations received from the users. Using a sequential list of collected locations and speeds enables the server to identify an accurate probe trace for a trip.

For a set of trips, the harvesting server of some embodiments identifies driving probe traces that have a driving end point in a corresponding trip. A driving endpoint for a trip is a point at which a driving path terminates (i.e., a speed of the vehicle falls below a predefined threshold and stays that way for a threshold period of time). The harvesting server excludes driving probe traces that are not terminated within an enclosed area in some embodiments. For example, all probe traces that end before a predetermined distance is traveled, end on a public road, end at a traffic light, end at a stop sign, or other traffic events, are excluded from the probing data. In some embodiments, the harvesting server excludes these traces employing different tools such as public road networks, traffic data, etc.

The remaining driving probe traces are matched against commercial parcels to identify probe traces that have ended within the boundaries of these parcels (i.e., to identify vehicles that are parked within an enclosed area associated with the POI's parcel). Each commercial parcel covers an area that is enclosed by a polygon. In some embodiments, each time a map service receives a new set of commercial parcels or a new set of public road networks (e.g., from one or more road network vendors), the harvesting servers of the map service perform the above-mentioned process of finding valid driving probe traces that terminate within the boundaries of a commercial parcel (i.e., probe traces that terminate inside a parcel polygon). By performing this process, a set of candidate driving probe traces for identifying vehicle points of entry to a commercial entity are identified.

A driving probe trace for a typical driver with a GPS enabled mobile device shows a driving path on a road network that at a particular point along a public road branches off the public road, enters a private road or driveway, and ultimately stops at some point (e.g., at a parking lot or garage). In order to ensure that the particular point where the trace leaves the public network is an entry point, some embodiments trace the driving path backward from the point where the car is parked until reaching a particular point where the trace intersects with the public road network. Some embodiments identify the intersection point as a point of entry to the parking lot.

Some embodiments take a step further to ensure that the intersection point is indeed a point of entry to the enclosed area. The reason being, occasionally, an intersection point does not lead a backward tracing onto a public road network. For example, sometimes the intersection point is merely a different level of a parking structure along the public road (e.g., where the probing vehicle is parked). The intersection point can also be an underpass leading to the other side of a road, a bridge over a road, etc. As such, some embodiments only identify a particular point as an entrance to a parking facility of a commercial property only when the backward tracing can be continued, after the particular point is reached, for a predefined distance along a drivable public road.

Some embodiments identify exit points from a POI in a similar fashion to the identification of the points of entry to a POI. That is, some embodiments analyze a set of probing traces that starts from a parking garage of a commercial property, continues on a private road, and merges on a public road. In order to ensure that the private road of the commercial property has indeed merged onto a public road, some embodiments make sure that the probe trace continues on the public road, from a point that the private road intersects with the public road, for a threshold distance.

Some embodiments utilize a customized path-based map matching algorithm for the backward tracing, both before and after meeting the public road network. The map matching for some such embodiments should fail during the trace before meeting the public road network and should succeed for a certain distance after meeting the public road network. That is, the backward tracing cannot be matched on a map representation before a particular point, at which the trace intersects with a public road in the public road network, while it can be matched on the map representation, after the particular point.

A map representation usually is comprised of various elements such as lines, curves, etc., that represent a region of the world. In a simple map matching, a fixed tolerance distance from road representations is set up and any probe that is within the tolerance distance of the road is considered to be on the road. This fixed tolerance defined for standard map matching, however, may result in inaccurate probe tracing. In a customized map matching defined by some embodiments, the tolerance distance can have different values depending on a set of attributes of the public road (e.g., number of lanes, number of intersection segments, etc., of the public road at or around the point of entry).

After one or more driving points of entry to an enclosed area associated with a POI are discovered, some embodiments identify one or more entrances to a building associated with the POI. That is, some embodiments trace a walking path of a GPS enabled mobile device from a stop point, at which a corresponding vehicle is considered to be parked, to an entrance of the building. After identifying one or more vehicle points of entry for a commercial parcel, some embodiments determine whether the commercial parcel is associated with a building footprint. After determining that one or more building footprints are associated with the commercial parcel (e.g., based on commercial parcels data and building footprints data), these embodiments start analyzing the walking paths that are attached to some or all of the driving paths that ended in the commercial parcel.

Some embodiments identify the entrances to a building by determining that a set of walking probe traces, attached to a subset of terminated driving probe traces, converge at a particular area of the building and diverge afterwards. Some embodiments identify each convergence area by determining that the walking probe traces intersect with a footprint of a building at the particular area. The convergence area (e.g., a centroid of walking path intersections with the building footprint) is indicative of an entrance to the building. Some embodiments examine all walking probe traces that intersect with a building footprint, irrespective of the walking probe traces being attached to a driving probe trace or not. Thus, if a user carries her portable device while walking to a nearby business (and allows the collection and transmission of location data during this walk), the probe trace may be used in some embodiments irrespective of whether the walking trace was attached to a driving trace. Similarly, walking traces attached to transit trips may be used as well in some embodiments.

In some embodiments, the map service receives building footprints associated with the commercial parcel polygons from one or more third-party vendors. The building footprints are mapped to commercial parcels in order to identify which buildings are associated with each parcel polygon. This way, when several different buildings (of different POIs) are associated with the same parking lot, convergence of a set of walking paths in front of each building's footprint is indicative of an entrance to that building. In some other embodiments, the acquired parcel polygons include the POIs associated with the polygons and no mapping of the building footprints on the parcel polygons is required.

Location data collected from a set of mobile devices over a period of time, as any other crowd sourced data, is based on statistical data and therefore not always accurate. In order to raise the level of accuracy, some embodiments utilize various filtering mechanisms. For instance, in some embodiments, if the map service determines that an identified point of entry to a parking lot is too far away from the POI (i.e., the distance between the parking entrance and the building associated with the requested address is beyond a threshold), the map service disregards the point of entry as a parking entrance associated with the POI. As another example, when an enclosed area is larger than a predefined area and has several identified points of entry, the map service disregards the identified points of entry (i.e., does not store the points of entry in the points of entry database).

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
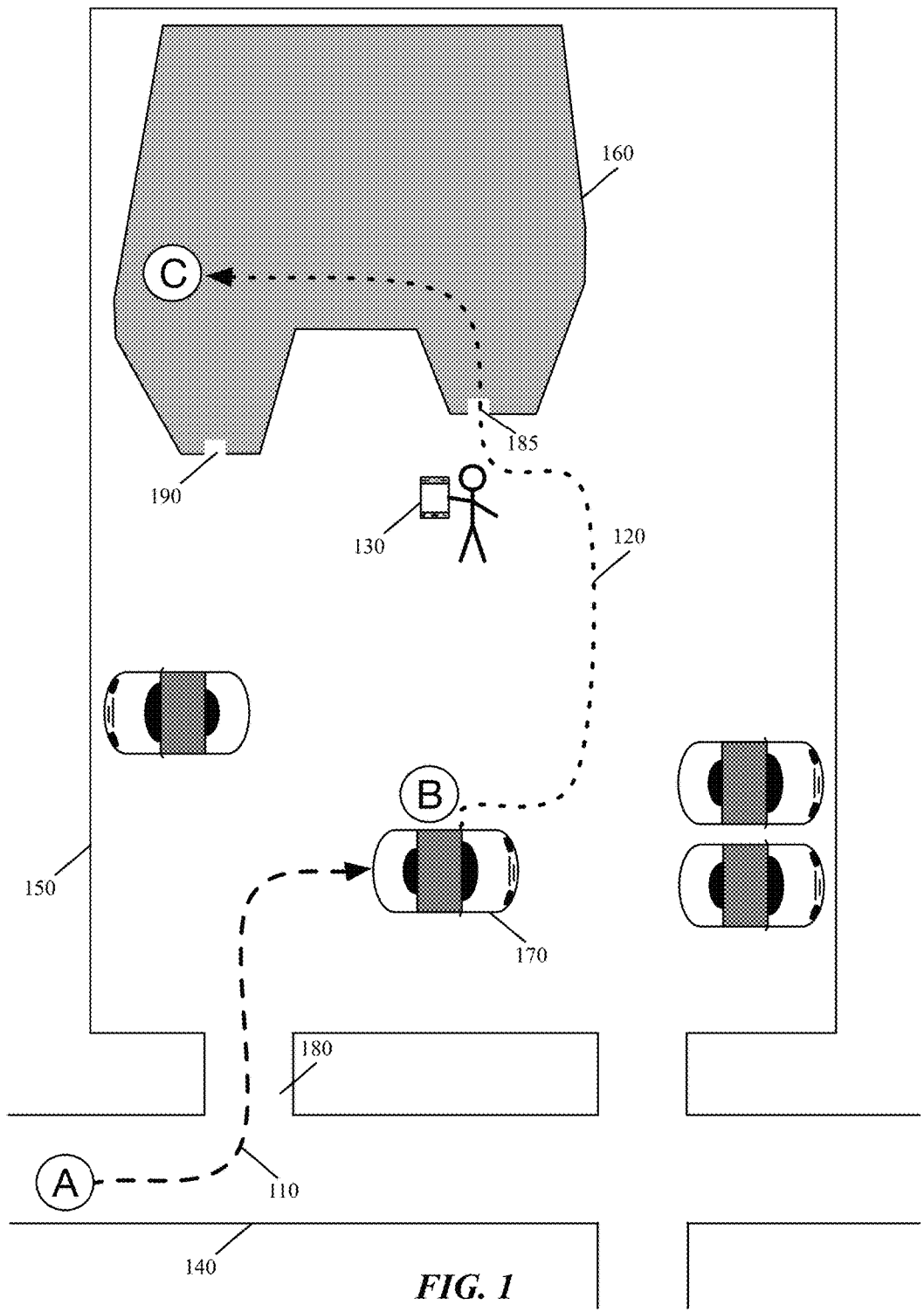
FIG. 1 illustrates example probe traces that some embodiments use to identify accurate entry points to a parking garage and a building associated with a commercial entity.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for identifying one or more points of entry to and/or exit points from a point of interest (POI) using crowd sourced data received from a set of mobile devices over a specific period of time. The POI, in some embodiments, includes any type of a commercial entity (e.g., a shopping mall, a store, a business, etc.). The method of some embodiments identifies one or more vehicle points of entry to an enclosed area (e.g., a parking garage) associated with a point of interest, as well as one or more exit points from the enclosed area. The method also identifies one or more points of entry to a building associated with the POI (e.g., one or more doors to a museum).

When a user requests for directions to a particular POI in a navigation application, the method provides these points of entry to the application as the real driving and walking destinations when calculating a route to the particular POI. Specifically, the navigation application generates a set of navigation instructions for the requested POI, which includes both driving instructions and walking instructions. The driving instructions guide the user to a vehicle point of entry (i.e., a driving destination of the trip) and the walking instructions guide the user from where the vehicle is parked to an entrance of a building corresponding to the requested POI (i.e., the ultimate destination of the trip).

In some embodiments, the method is implemented by a set of harvesting servers (e.g., associated with a map service, or separate from a map service) that generates a database storing all of the identified entry points data (along with other map data), which can be used by different map and navigation applications (e.g., to calculate routes having the entry points as the real destinations, to display the entry points as a juncture at which a maneuver is required, etc.). The map service of some embodiments generates the entry points data for different commercial entities and POIs based on (1) public roads network data, (2) commercial parcels data, (3) building footprints data, and (4) probe traces that each tracks a set of location data received from a sample mobile device.

The public roads network, building footprints, and commercial parcels are obtainable from third-party vendors in some embodiments. Each commercial parcel covers an area that is enclosed by a polygon. The probe traces (i.e., collected location data that tracks a driving/walking path of a device), in some embodiments, are passively crowd sourced from mobile devices. That is, each mobile device locally stores location data collected by a global positioning system (GPS) receiver and other sensors (e.g., an accelerometer, a pedometer, a barometer, etc.) when the GPS receiver is enabled on the device. Each mobile device then transmits this information passively (e.g., once a Wi-Fi connection is detected, occurrence of a certain event, periodically, etc.) to a harvesting server or service in some embodiments. Using a sequential list of collected locations and speeds enables the server to identify accurate probe traces for different trips.

FIG. 1 illustrates example probe traces that some embodiments use to identify accurate entry points to a parking garage and a building associated with a commercial entity. More specifically, this figure shows a driving probe trace and a walking probe trace that a map service collects from a GPS enabled mobile device in order to generate different points of entry to enter a garage and a building corresponding to a point of interest such as a movie theatre. The figure includes a portion of a road network 140 and a commercial parcel polygon 150, a driving path 110, a walking path 120, and a building footprint 160.

As stated above, some embodiments use probe traces harvested from mobile devices traveling on the roads, licensed parcel polygon data, licensed road, and licensed building footprints, to find entry points to the buildings associated with the requested destinations. The illustrated road network 140 is a part of a public road network data (received from a vendor), which defines interconnected roads (e.g., intercity and intra-city roads, highways, freeways, etc.), as well as a set of physical road characteristics (e.g., speed limit, functional class, traffic lights, number of lanes, lane widths, etc.).

The commercial parcel polygon 150 and building footprint 160 are also part of commercial parcel data and building footprint data that define an outer perimeter of a commercial property and a building, respectively. Some embodiments receive commercial parcel data and/or building footprint data from one or more third-party vendors, while other embodiments use self-generated commercial parcel data and/or building footprint data. Still other embodiments use a combination of third-party and self-generated data for the commercial parcel and/or building footprint data. As will be described in more detail below, this data is used to determine proper entrances to the parking lot associated with the parcel polygon 150 and movie theatre associated with the building footprint 160.

The driving and walking probe traces 110 and 120 are location data generated by a mobile device 130 (e.g., a smart phone) carried by a user along a driving path and a walking path. In some embodiments, when a GPS receiver of a mobile device is activated, every unit of time (e.g., every five seconds, every one minute, etc.), the device may record location, speed, and other positioning related data on a driving or walking path along which the device travels. In order to reduce the amount of data recorded (e.g., to save memory, processing, etc.), in some embodiments this unit of time is adjustable (i.e., time intervals between the recordings can be extended, or reduced). For example, if the time intervals are doubled from 1 second to 2 seconds, half as many data points will be collected and stored by the mobile device.

A GPS receiver can determine the device's latitude, longitude and/or altitude position at a given time. From a list of GPS data recorded over a period of time, a map service can determine the speed, direction, and other location related data for the device. These location related information can also be determined based on other signals received through other sensors of the device (e.g., an accelerometer, a gyroscope, a compass, etc.), which indicate the speed and orientation of the device. For example, when an accelerometer makes measurements above a certain threshold, the mobile device can determine that the device is moving (i.e., the user is walking, running, etc.).

The position of the device can also be determined through other means such as an IP address or signals received at a cell phone's antenna from one or more base stations (if the mobile device is a cell phone), and/or from Wi-Fi signals (e.g., from wireless access points) in some embodiments (e.g., once inside a building that provides Wi-Fi). In some embodiments, the accelerometer, gyroscope and/or compass modules of the device may be used as a pedometer to track a mobile device's movements (e.g., the number of steps taken by a user when the device is in the user's hand or pocket, etc.).

As stated above, the location data, in some embodiments, is gathered and recorded locally on the device only when the GPS receiver of the device is activated. Some embodiments do not record any location data when the GPS module is inactive. For example, when a user turns the device off while none of the applications that require location data (i.e., use GPS services) are active, the device does not record location data. However, as long as one application that uses GPS services (e.g., a camera application in which locations of captured images are recorded), the location data will be recorded on the device.

Some embodiments activate the GPS or keep the GPS activated intelligently for a specific period of time, even when a user deactivates the GPS module. For example, when a GPS enabled device is turned off after a driving path of a trip comes to an end, some embodiments keep the GPS activated for a short period of time in order to trace a walking path from where the vehicle is stopped to a potential building door (the ultimate destination of the trip). Some embodiments determine the area in which the vehicle has stopped before deciding to activate the GPS. For example, some embodiments activate the GPS (or keep the GPS active) for a particular period only when the device is being used in an urban area. Conversely, some embodiments do not record location data, even if the GPS module is activated, in particular situations. For example, when the battery power of the device is below a certain percentage, some such embodiments do not collect and record location data in order to preserve the battery life.

FIG. 1 illustrates an end point of a driving path of a trip traveled by car 170 that is used as a driving probe trace 110 in order to identify entry point 180 to the garage associated with commercial parcel 150. More specifically, the GPS enabled device 130 (e.g., a cell phone, a portable car navigator, a laptop, a wearable computer such as a smartwatch, a tablet, etc.) carried in the car 170 has moved from point A to point B before the driving path ended at point B. When this driving path is reported to a map service that identifies entry points, the map service uses the driving probe trace 110 to determine whether this trace is a valid trace to participate in a vehicle entry point evaluation for the POI 160. As shown, the probe starts from a public road and leaves the public road network 140 at vehicle point of entry 180 to enter a private road. The probe then finishes within the boundaries of a parcel polygon 150 associated with the POI 160. As such, this probe can be used by the map service to identify the entrance 180 as an accurate entry point to the garage (when a certain number of other candidate probes demonstrate similar characteristics and also if the server does not require backward tracing for confirming the entry point).

After the entry point 180 is identified, some embodiments continue analyzing the probe traces to identify an entrance 185 (e.g., a door) for the POI associated with the building footprint 160. Some embodiments determine the identified entrance as the final destination of a trip to this POI. As discussed above, some embodiments leave the GPS of the device 130 activated for a certain period after the driving path finishes, even if the user of the device closes all the applications that the device is executing and turns the device off. Some other embodiments, however, generate walking probe data and transmit this data to the server only if the GPS receiver is providing GPS services (even for a single application). As shown, the walking probe trace 120 starts from point B and finishes at point C. The walking probe trace, however, intersects with the building footprint 160 at point 185, which is determined to be the entrance to the building.

When there is an adequate number of walking probes that intersect with the building at the same area around the entrance 185, the map service of some embodiments identifies this entrance as one of the proper entrances to the POI associated with the footprint 160. As illustrated, there can be more than one entrance to the POI (i.e., the second point of entry 190). Some embodiments identify each entrance separately, when there are enough walking probe traces for each point of entry.

As described above, each GPS enabled mobile device that participates in an entry point probing stores location data collected by its GPS receiver and other sensors in a local data storage on the device. A mobile device participating in the location data collection for a map service accumulates data continuously. In some embodiments, the accumulated data includes speed, position, and heading data derived from GPS coordinates and/or other data received from other sensors of the device, or other resources (e.g., wireless access points).

The accumulated data, upon occurrence of an event, is transmitted to a harvesting server through cell sites and base stations, or other networks (e.g., the Internet). In some embodiments the locally stored data is actively (e.g., periodically) transmitted to a harvesting server, while in other embodiments, each mobile device transmits the stored location data passively (e.g., once a Wi-Fi connection is detected, occurrence of a certain event, etc.) to the harvesting server. The collected data, in some embodiments, is transmitted to the harvesting server anonymously. That is, the harvesting server will not be informed of the identification of the user or device, from which the data is received.

In some other embodiments, the identification of the users may or may not be included in the data sent to the harvesting servers, depending on the authorizations received from the users. In some embodiments, the mobile device accumulates and transmits the location data in cyclical timing windows. For example, in some embodiments, a mobile device uses a first portion of a window of time to collect data and uses a second portion of the time window to look for an opportunity to transmit the accumulated data. The transmitted sequential list of collected locations and speeds enables the harvesting server to identify accurate probe traces for different trips.

Figure 2:
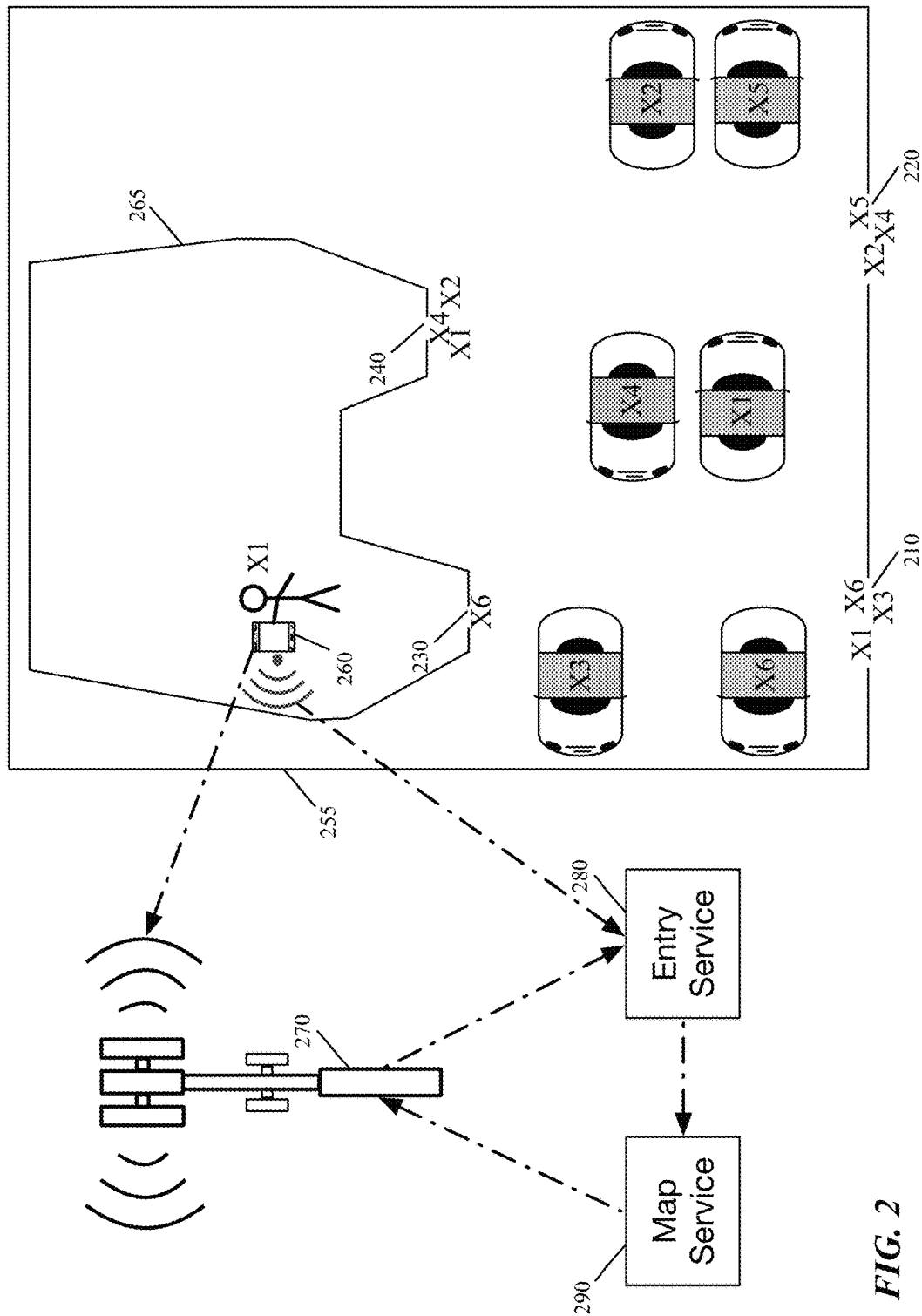
FIG. 2 illustrates a map service of some embodiments collecting location data from one of several mobile devices, which is used in identifying one or more entries to a particular location.

FIG. 2 illustrates a map service of some embodiments collecting location data from one of several mobile devices. The collected data is used for identifying one or more entries to a particular location. The figure includes a parking lot 255 with two vehicle entry points 210 and 220, a POI 265 with two entrances (doors) 230 and 240, a nearby cell tower (or base station) 270, an entry server 280, and a map and navigation server 290. The figure shows portions of driving and walking probe traces collected from probes X1-X6 that have entered the parking lot 255. More specifically, probes X1, X3, and X6 have entered the parking lot through the entry point 210, while probes X2, X4, and X5 have entered through the entry point 220. Additionally, as shown, probes X1, X2, and X4 have entered the POI 265 through the door 240, while probe X6 has entered this POI from door 230.

Probes X1-X6 are associated with mobile devices capable of determining their own locations and transmitting information regarding their locations to a server. These mobile devices may include any mobile computing and communication devices such as mobile phones, hand-held navigation devices, laptops, PDAs, wearable computers such as smart watches, or portable car navigators. The mobile devices, in some embodiments, are devices that are identically manufactured for similar functionality, while in other embodiments they are different types of devices differently manufactured and equipped for different functions.

Based on the illustrated figure, the entry service 280 cannot determine from which door probes X3 and X5 have entered the building, if they have at all, since no walking probe data has been generated by any of the devices for these probes. As discussed above, there can be many reasons for not generating walking probe data in some embodiments. For example, probes X3 and X5 may not have generated walking tracks because their associated GPS receivers were deactivated after their driving probe traces terminated in the parking lot, or due to insufficient battery power, their GPS receivers were deactivated, etc. In some embodiments, a user may simply opt-out from participation in the location data collection notwithstanding the aforementioned circumstances. Therefore, probes X3 and X5 are not used for identification of the doors 230 and 240 to the building 255. In some embodiments, GPS functionality of a mobile device is not turned on unless the user has directed the device to execute operations that actively produce GPS coordinates (such as navigation or taking geo-tagged photographs).

FIG. 2 also shows that location data is being collected from probe X1, which is associated with mobile device 260, through a service provider (represented by the cell site 270). The generated driving and walking probe traces of probe X1, as shown, are transferred to the entry server 280 directly (e.g., through a network such as the Internet). The figure also shows that this collected data can be transferred to the cell tower 270 because in some occasions, even when the device 260 is not connected to a wireless service, the recorded location data can be transmitted to the server 280, through the cell site 270. Collected location data from the different cell sites and networks is then aggregated at the entry service or server 280. The entry service uses the aggregated data to generate vehicle entry points and building entrances for different POIs, for which the entry sever has parcel polygons and building footprints.

In other words, the entry server 280 receives the different probe traces from different mobile devices and after aggregating the data, analyzes the aggregated data for generating entry points. For such analysis, the entry server 280 uses parcel polygon data and building footprint data received from different sources. After going through all collected probe traces for the POI, the entry server 280 of some embodiments disregards the entry points for which, a minimum number of probe traces have not been analyzed. For example, in the illustrated example, if the defined threshold number of probes is three, entry points 210, 220 (for the garage), and 240 (for the building) are recognized as accurate points of entry. However, entry point 230 is disregarded by entry server 280 (i.e., will not be stored in the entrance database), since there is only one recorded probe that has entered the building from this entry point.

Conversely, for a particular POI, the entry server 280 may identify probe entry points (entry points on probe traces) that range from a few to a few thousands that can be mapped to each real entrance of the POI, depending on how popular the POI is. For vehicle probe entry points, due to GPS errors (of a few meters) and the way each driver drives, the entry server often does not find identical probe entry points. Rather, the identified probe entry points are clustered around each actual entrance (e.g., cluster of probes X1, X3, and X6 around the actual entrance 210). The entry server of some embodiments calculates the centroid of each cluster of probe entry points in order to generate an accurate location for each real vehicle entrance. The number of probe points in each cluster indicates the relative traffic of the entrance for the POI. By keeping track of the direction of the probe traces at each cluster, the entry server can also average the traces to give the actual direction (heading) of the entrance.

Different embodiments use different types of evaluations and assessments to filter the number of entrances for properties for which several separate actual entrances are identified. For instance, some embodiments may forgo publishing (storing) an actual entrance for a POI, for which multiple actual points of entry are identified, when the entrance has a cluster of probe entry points that includes less than 5% of the total number of probe entry points. In the illustrated example, the total number of probe entry points is 6 (i.e., X1-X6 in two separate clusters of probe entry points). Additionally, some embodiments do not publish any entrance for which the amount of traffic is less than 10% of an actual entrance with the top traffic. For instance, if for the busiest actual entrance of a POI, a traffic of one hundred probes is identified, any other actual entrance that has a traffic of less than 10 vehicle entries will be disregarded by some such embodiments.

After generating the entry point database, a map and navigation server or service such as the map service 290 queries this database for entry points of a particular POI in order to calculate and generate different routes and navigation instructions for the particular POI. The map service of some other embodiments may query this database to simply show the entry points of the POIs in an area, when the map service displays the map of area to a user. Other embodiments use the generated entry point records of the entrance database for other reasons. For example, when the map service 290 receives a request from a user for navigation instructions to an address associated with the building 265 in FIG. 2, the map service does not simply calculate the routes to the requested address based on a centroid location in front of the building 265 (and then show that centroid location as the final destination).

Instead, the map server 290 queries the entry server 280 for the vehicle points of entry and building entrances associated with the requested address. After receiving these points of entry, the map server 290 calculates the driving routes up to the closest identified vehicle point of entry, and calculates the total route by adding the walking distance to the closest entrance of the building. Additionally, in the generated navigation instructions for each route, the map server identifies the vehicle point of entry as a navigation point (i.e., a juncture at which a maneuver is required) and also shows the building entrance (door) as the final destination of each calculated route. As illustrated in the figure, after generation of the routes and navigation instructions, the map server 290 transmits the generated data to the requestor device through a cell tower in some embodiments.

One of ordinary skill in the art would realize that, although the map and entry servers 290 and 280 are shown as two separate servers, in some embodiments, these two servers are implemented as two separate applications or modules that execute on a single map server or service. Conversely, in some other embodiments, each of these servers is implemented by two or more physical servers.

More detailed embodiments of the invention are described below. Section I describes discovering vehicle points of entry and building entrances for a commercial entity (e.g., a business, an institution, a mall, a store, a government building, or any other type of commercial building or point of interest). Next, Section II describes example electronic systems with which some embodiments of the invention are implemented. Finally, Section III describes a map service operating environment.

I. Discovering Entrances and Exits for a Commercial Entity

For a set of trips, the harvesting server of some embodiments identifies driving probe traces that have a driving end point in a corresponding trip. A driving endpoint for a trip is a point at which a driving path terminates. Some embodiments define a driving path as terminated when a moving speed of the device (carried in a vehicle) from a speed above a threshold falls below the threshold (e.g., the speed falls below 5 MPH). It should be understood that the device may continue with a speed under the threshold for a period of time (e.g., when a person holding the device continues on walking towards the destination). However, as long as the moving speed of the device does not exceed the threshold, the driving path is considered to be terminated. The point at which the speed of the device falls below the threshold is determined to be a stop point in some embodiments.

As described above, a driving probe trace for a typical driver with a GPS enabled mobile device shows a driving path that at a particular point along a public road branches off the public road, enters a private road or driveway, and ultimately stops at some point (e.g., at a parking lot or garage). In order to ensure that the point where the trace leaves the public network is a legitimate entry point, some embodiments trace the driving path backward from the point where the car is parked until reaching a particular point where the trace intersects with the public road network. When the driving path can be successfully traced back from the stop point to the public road, some embodiments identify the intersection point of the trace with the public road network as a vehicle point of entry to the parking lot (which more often than not matches the same point at which the device left the public network and entered the private road).

In other words, for each such driving probe trace, some embodiments trace backward from the stop point (which is within an enclosed area) along the driving path, until the backward tracing meets the public road network. The point where the trace meets the public road network is identified as a vehicle entry point for the probe trace into the commercial entity. To be sure that the trace is not meeting the public road at a different grade (level), some embodiments determine that the probe trace stays on the public road network for a certain distance (backward). This is because even though the altitude levels of a trace are identifiable (e.g., from different sensors of the device), those levels won't match the road network's levels which are identifiable as z-levels (e.g., 0, −1, 1, etc.). Each successful map match for a certain distance on the public road network will produce one probe entry point (in a cluster of probe entry points) for the commercial entity.

Figure 3:
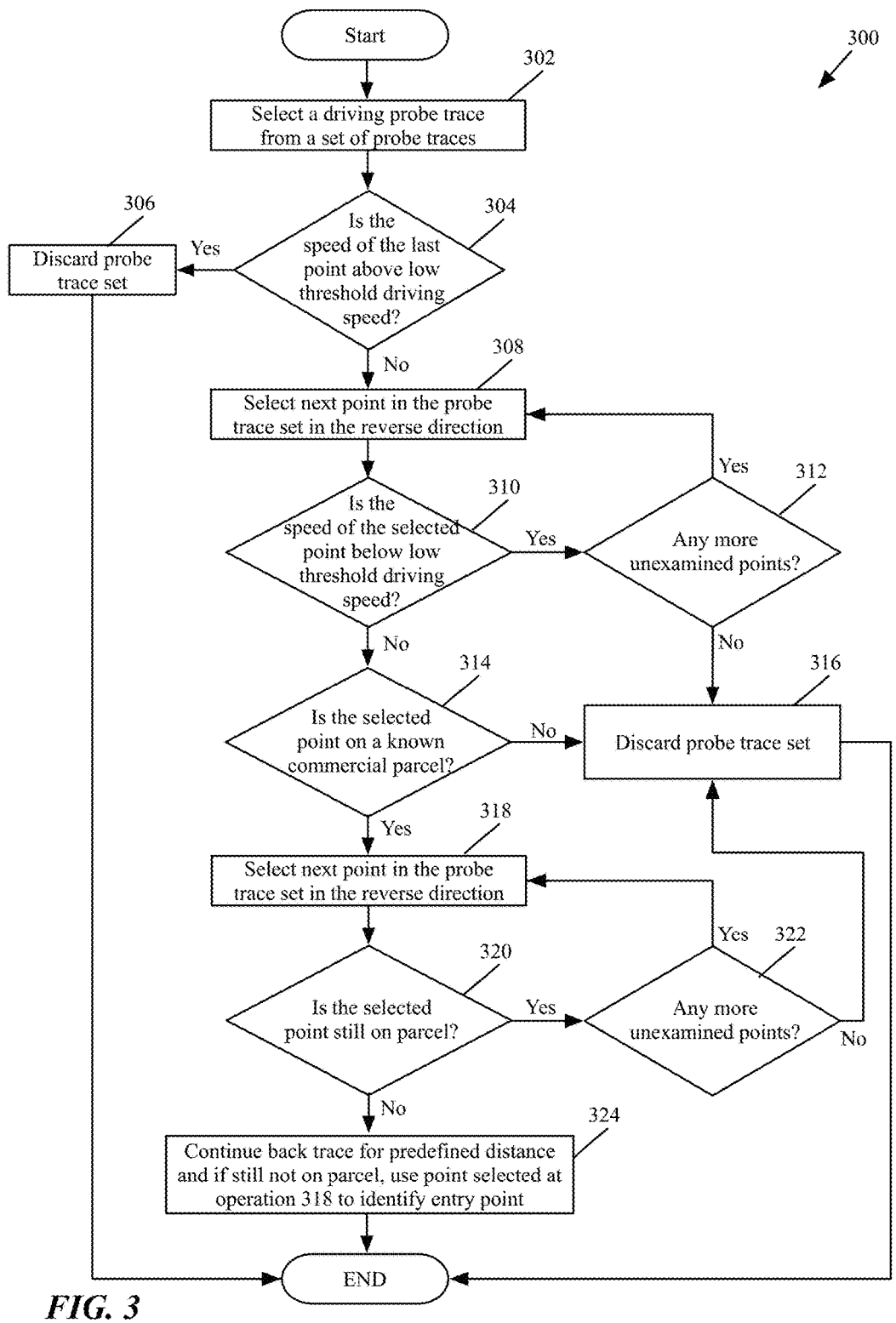
FIG. 3 conceptually illustrates a process of some embodiments for identifying points of entry to an enclosed area (e.g., a parking lot) associated with a POI.

FIG. 3 conceptually illustrates a process 300 of some embodiments for identifying points of entry to an enclosed area (e.g., a parking lot) associated with a POI. In some embodiments, the process is performed by an entry point server that provides an entrance database for commercial properties to one or more harvesting servers, while in some other embodiments, the process 300 is performed by a map server that provides mapping and navigation services to different users.

The process starts by selecting (at 302) a driving probe trace from a set of driving probe traces. The selected driving probe trace defines a driving path of a mobile device. In some embodiments the set of probe traces includes driving paths of several different devices (e.g., around a common region). The process receives the set of driving probe traces through different means (e.g., cell towers and base stations) from a set of GPS enabled mobile devices that has recorded these traces while being used by different users.

After selecting a probe trace in the set of probe traces, the process determines (at 304) whether the speed of the device (i.e., the device that has generated the probe) at the last point of the probe is above a threshold driving speed. When the process determines that the speed of the device was above a threshold speed (e.g., 5 miles per hour) the process discards (at 306) the probe trace and ends. This is because the discarded probe trace does not include an end point of a driving path, at which a vehicle carrying the device has stopped. In some embodiments, when the process determines that the speed is above the threshold, the process does not end and instead returns to operation 302 in order to select the next probe and analyze the next probe (if any probe left in the set of driving probe traces).

When the process determines that the speed of the device at the last point of the probe has fallen below a threshold speed (e.g., 5 MPH) the process realizes that the last point of the probe is indeed a stop point for the driving probe trace. As described above, the stop point of a driving probe trace is not necessarily a point at which a moving speed of a device falls to zero. Rather, the stop point is a point at which the moving speed of the device falls from a value higher than a threshold to a value lower than the threshold (the speed may still stay above zero because the device may continue to move on a walking path).

After identifying the stop point, the process determines whether the probe is traceable backward to a public road network. In order to make such a determination, the process selects (at 308) the next point in the probe in the reverse direction. That is, the process of some embodiments selects the last stored location before the stop location on the driving trace probe. The process then determines (at 310) whether the speed of the device at the selected point is still below the low threshold driving speed (i.e., still below 5 MPH). If the process determines that the speed is above the low threshold driving speed, the process proceeds to operation 314, which is described below. On the other hand, if the process determines that the speed at the next selected location on the probe is still below the threshold, the process determines (at 312) whether any more unexamined points are left for examination. This is because, when a device is moving at a slow speed, for example in a parking lot and not on a road, the speed at the last stored location before the stop point might still be below the threshold speed.

For example, the device might be moving at a slow speed in a garage or parking area because the driver of the vehicle is looking for a parking spot. As such, some embodiments keep selecting the next point of the probe in the reverse direction until the speed of the device is above the threshold (which could be an indication that the device is moving on a public road). Therefore, when the process determines (at 312) that there are more unexamined points for examination, the process returns to operation 308 to select the next unexamined point. On the other hand, when the process determines that no more unexamined points are left, the process discards (at 316) the probe trace and ends. As described above, in some embodiments, the process does not end and instead returns to operation 302 to select the next candidate probe trace.

When the process determines that the speed of the device at the last selected point is above the low threshold driving speed, the process determines (at 314) whether the selected point is on a commercial parcel. As described above, commercial parcels data is obtained and stored on the map server to be used by the entry point service. When the process determines that the selected point is not on a commercial parcel, the process discards (at 316) the probe trace and ends (or returns to operation 302). On the other hand, if the process determines that the selected point is indeed on a commercial parcel, the process selects (at 318) the next point in the probe trace in the reverse direction. The process then determines (at 320) whether the selected point is still on the commercial parcel. The process of some embodiments does so in order to back trace the probe until it reaches the point from which the private road of the commercial parcel is separated from a public road (i.e., the intersection point between the private and public road).

As such, after determining that the selected point is still on the commercial parcel, the process determines (at 322) whether any more unexamined points are left for examination. when the process determines that there are more unexamined points for examination, the process returns to operation 318 to select the next unexamined point on the commercial parcel. On the other hand, when the process determines that no more unexamined points are left, the process discards (at 316) the probe trace and ends (or returns to operation 302 to select the next candidate probe trace). In some embodiments, when the process determines that the next selected point is not on the commercial parcel anymore, the process identifies the point at which the private road intersects with the public road as the point of entry to the commercial entity. However, some other embodiments take a step even further than this in order to ensure that the intersection point is indeed a point of entry to the commercial property. The reason being, occasionally, an intersection point does not lead a backward tracing onto a public road in the network. For example, sometimes the intersection point is merely a different level of a parking structure along the public road (e.g., where the probing vehicle is parked). The intersection point can also be an underpass leading to the other side of a road, a bridge over a road, etc. As such, some embodiments only identify a particular point as an entrance to a parking facility of a commercial property only when the backward tracing can be continued, after the particular point is reached, for a predefined distance along a drivable public road.

Therefore, after determining that the last selected point is not on the commercial property anymore, the process continues to back trace for a particular distance (e.g., 200 meters) and if the trace is still not on the commercial parcel, the process identifies the last selected point in operation 318 as the point of entry to the commercial parcel. In other words, if the process determines that the backward tracing does not meet the public road network, the process ends (i.e., no accurate point of entry can be recognized for the received driving probe trace). On the other hand, when the process determines that the backward tracing meets the public road network at a particular point, and continues for a threshold distance on the public network, the process ascertains that the probe trace is indeed traceable on the public road.

A map representation usually is comprised of various elements such as lines, curves, etc., that represent a region of the world. In a simple map matching, a fixed tolerance distance from road representations is set up and any probe that is within the tolerance distance of the road is considered to be on the road. This tolerance defined for map matching, however, may result in inaccurate probe tracing if the tolerance is not adjusted based on a set of road attributes.

For example, when there is a divider in the middle of the public road and there is no left turn available to enter a parking lot for the cars that are moving on the opposite side of the road, these cars have to pass the entrance and make a U-turn on a first available break in the road median. As such, if the median break is farther down the road, a fixed tolerance amount (e.g., 20 meters) may result in inaccurate identification of the point of entry in the backward tracing on the road. Therefore, some embodiments customize the tolerance distance (i.e., relax the tolerance) when there are such intersection segments around a point of entry.

As another example, in some geographical areas, a road may be represented (on a map presentation) as having two separate lanes (to show both directions of traffic) in some areas, while in some other areas, the same road is represented as having one lane. A probe trace, however, moves, more or less, on a direct line. Therefore, when a probe is back traced, the trace might become confusing when a one lane road representation turns to two lanes or vice versa. As such, the tolerance distance should be adjusted in this type of situations as well (e.g., some embodiments use the number of lanes in a multiplication function to identify a greater level of tolerance).

Some embodiments, after identifying the distance for which the public road should be traced back, determine whether the probe is traceable on the public road backward for the identified threshold distance. Some such embodiments, authenticate the point at which the backward tracing and the public road intersect, as a valid vehicle entrance point for the parcel polygon only after determining that the probe is traceable backward for the identified distance. Additionally, after authenticating the point of entry, some embodiments mark the analyzed driving probe trace (on which the backward tracing is performed) as a candidate probe for identifying the entrances (doors) to a building associated with the parcel polygon.

The process 300, in some embodiments, could be implemented using several sub-processes, or as part of a larger macro process. Additionally, some embodiments perform variations of the process 300. The specific operations of the process 300 may not be performed in the exact order shown and described. For example, some embodiments determine whether a driving path of each probe branches off a public road into a private road first. After such determination, some such embodiments after concluding that the driving probes terminate within a parcel polygon's boundaries, identify a particular point at which each probe left the public road network as the point of entry for the parcel polygon. That is, these embodiments identify the particular point as a point of entry when the speed of the probe falls below a predefined speed after leaving the public road and entering the private road.

Furthermore, the specific operations shown and described for this figure may not be performed in one continuous series of operations, and different specific operations may be performed in different embodiments. For example, instead of performing some of the enumerated operations above, some embodiments first identify a set of probing traces that ends in a commercial parcel, and then analyze each probing trace in the set to identify one or more points of entry. The process of some such embodiments first determines whether each one of the driving probe traces has ended within the commercial parcel (e.g., whether the point at which the speed falls below the threshold is within the commercial parcel). As described above, to make such determination, the process of some embodiments determines whether a probe trace terminated on a public road (as opposed to a private road), or at a traffic light, a stop sign, or any other traffic event that could cause the probe to end.

When the process determines that the selected probe trace is indeed terminated within an enclosed area, the process matches the probe trace against a database that includes all commercial parcel polygons or a set of commercial parcel polygons that are defined for a particular region for which the probe traces are received. In other words, for the remaining probe traces, for which, the stop points are considered to be within an enclosed area, the process tests the stop points against all or a subset of licensed parcel polygons for commercial entities. When these embodiments find a match between the stop point of the probe trace and a parcel polygon, the embodiments identify the probe trace as a valid probe trace to be analyzed for finding vehicle entry points to the commercial property.

Some embodiments identify exit points from a POI in a similar fashion the points of entry to the POI are identified. That is, some embodiments analyze a set of probing traces that starts from a parking garage of a commercial property, continues on a private road, and merges on a public road. In order to ensure that the private road of the commercial property has indeed merged onto a public road, some embodiments make sure that the probe trace continues on the public road, from a point that the private road intersects with the public road, for a threshold distance.

Figure 4:
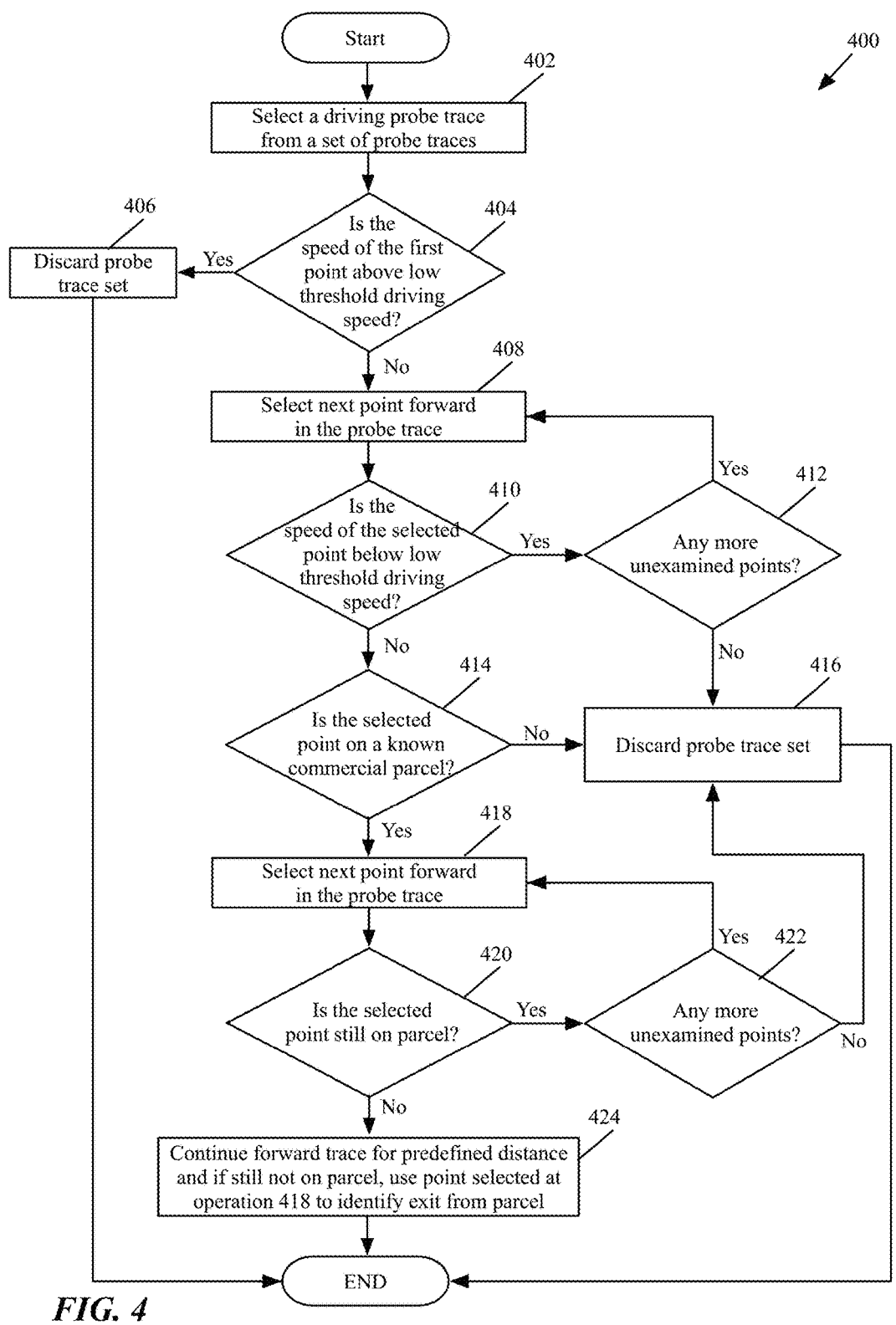
FIG. 4 conceptually illustrates a process of some embodiments for identifying exit points from an enclosed area (e.g., a parking lot) associated with a POI.

FIG. 4 conceptually illustrates a process 400 of some embodiments for identifying the exit points from an enclosed area (e.g., a parking lot) associated with a POI. In some embodiments, the process is performed by an exit point server that provides the exit points database for commercial properties to one or more harvesting servers, while in some other embodiments, the process 400 is performed by a map server that provides mapping and navigation services to different users.

The process starts by selecting (at 402) a driving probe trace from a set of driving probe traces. The selected driving probe trace defines a driving path of a mobile device. In some embodiments the set of probe traces includes driving paths of several different devices (e.g., around a common region). The process receives the set of driving probe traces through different means (e.g., cell towers and base stations) from a set of GPS enabled mobile devices that has recorded these traces while being used by different users.

After selecting a probe trace in the set of probe traces, the process determines (at 404) whether the speed of the device at the first point of the probe is above a low threshold driving speed. When the process determines that the speed of the device was above the low threshold driving speed (e.g., 5 miles per hour) the process discards (at 406) the probe trace and ends. This is because the discarded probe trace does not include a departure (starting) point of driving from which a vehicle carrying the device has started a trip. In some embodiments, when the process determines that the speed is above the threshold, the process does not end and instead returns to operation 402 in order to select the next probe and analyze the next probe (if any probe left in the set of driving probe traces).

When the process determines that the speed of the device at the first point of the probe is below a threshold speed (e.g., 5 MPH) the process realizes that the first point of the probe is indeed a departure point for the driving probe trace. After identifying the departure point, the process determines whether the probe is traceable forward to a public road network. In order to make such a determination, the process selects (at 408) the next point forward in the probe trace. That is, the process of some embodiments, selects the next stored location after the departure location on the driving trace probe. The process then determines (at 410) whether the speed of the device at the selected point is still below the low threshold driving speed (i.e., still below 5 MPH). If the process determines that the speed is above the low threshold driving speed, the process proceeds to operation 414, which is described below. On the other hand, if the process determines that the speed at the next selected location on the probe is still below the low threshold driving speed, the process determines (at 412) whether any more unexamined points are left for examination. This is because, the speed at the last stored location after the departure point being below the threshold could be an indication that the device is moving at a slow speed (e.g., in the parking lot) and therefore is not on a public road yet.

As such, some embodiments keep selecting the next point of the probe forward until the speed of the device is above the threshold (which could be an indication that the device is moving on a public road). Therefore, when the process determines (at 412) that there are more unexamined points for examination, the process returns to operation 408 to select the next unexamined point. On the other hand, when the process determines that no more unexamined points are left, the process discards (at 416) the probe trace and ends. As described above, in some embodiments, the process does not end and instead returns to operation 402 to select the next candidate probe trace.

When the process determines that the speed of the device at the last selected point is above the low threshold driving speed, the process determines (at 414) whether the selected point is on a commercial parcel. When the process determines that the selected point is not on a commercial parcel, the process discards (at 416) the probe trace and ends (or returns to operation 402). On the other hand, if the process determines that the selected point is indeed on a commercial parcel, the process selects (at 418) the next point forward in the probe trace. The process then determines (at 420) whether the selected point is still on the commercial parcel. The process of some embodiments does so in order to trace the probe forward until it reaches the point from which the private road of the commercial parcel is merged onto a public road (i.e., the intersection point between the private and public road).

As such, after determining that the selected point is still on the commercial parcel, the process determines (at 422) whether any more unexamined points are left for examination. when the process determines that there are more unexamined points for examination, the process returns to operation 418 to select the next unexamined point on the commercial parcel. On the other hand, when the process determines that no more unexamined points are left, the process discards (at 416) the probe trace and ends (or returns to operation 402 to select the next candidate probe trace).

In some embodiments, when the process determines that the next selected point is not on the commercial parcel anymore, the process identifies the point at which the private road intersects with the public road as the exit point from the commercial entity. However, some other embodiments, similar to the embodiments that identify the entry points to a commercial property, take a step further in order to ensure that the intersection point is indeed a point of exit from the commercial property.

That is, after determining that the last selected point is not on the commercial property anymore, the process continues to trace the probe forward for a particular distance (e.g., 200 meters) and if the trace is still on the public road, the process identifies the last selected point in operation 418, as the exit point from the commercial parcel. In other words, if the process determines that the forward tracing does not meet the public road network, the process ends (i.e., no accurate exit point can be recognized for the received driving probe trace). On the other hand, when the process determines that the forward tracing meets the public road network at a particular point, and continues for a threshold distance on the public road network, the process ascertains that the probe trace is indeed traceable on the public road.

Some embodiments perform variations of the process 400. The specific operations shown and described for this figure may not be performed in one continuous series of operations, and different specific operations may be performed in different embodiments. Additionally, the specific operations shown and described for this figure may not be performed in one continuous series of operations, and different specific operations may be performed in different embodiments. Furthermore, the process 400 could be implemented using several sub-processes, or as part of a larger macro process.

For a particular POI, the entry server (or map service) may identify probe entry points (entry points on probe traces) that range from a few to a few thousands that can be mapped to each real entrance of the POI, depending on how popular the POI is. For vehicle probe entry points, due to GPS errors (of a few meter) and the way each driver drives, the entry server often does not find identical probe entry points. Rather, the identified probe entry points are clustered around each actual entrance.

The entry server of some embodiments calculates the centroid of each cluster of probe entry points in order to generate an accurate location for each real vehicle entrance. The centroid is calculated based on different algorithms and is not necessarily the center of a cluster of entry points. The number of entry points in each cluster indicates the relative traffic of the entrance for the POI. By keeping track of the direction of the probe traces at each cluster, the entry server can also average the traces to give the actual direction (heading) of the entrance.

Different embodiments use different types of evaluations and assessments to filter the number of entrances for properties for which several separate actual entrances (or exits) are identified. For instance, some embodiments may forgo publishing (storing) an actual entrance for a POI, for which multiple different actual points of entry are identified, when the entrance has a cluster of probe entry points that includes less than a threshold (e.g., less than 5% of the total number of probe entry points, less than 10% of an actual entrance with the top traffic, etc.). As an example, if for the busiest actual entrance of a POI, a traffic of one hundred probes is identified, any other actual entrance that has a traffic of less than 10 vehicle entries will be disregarded by some such embodiments.

Figure 5:
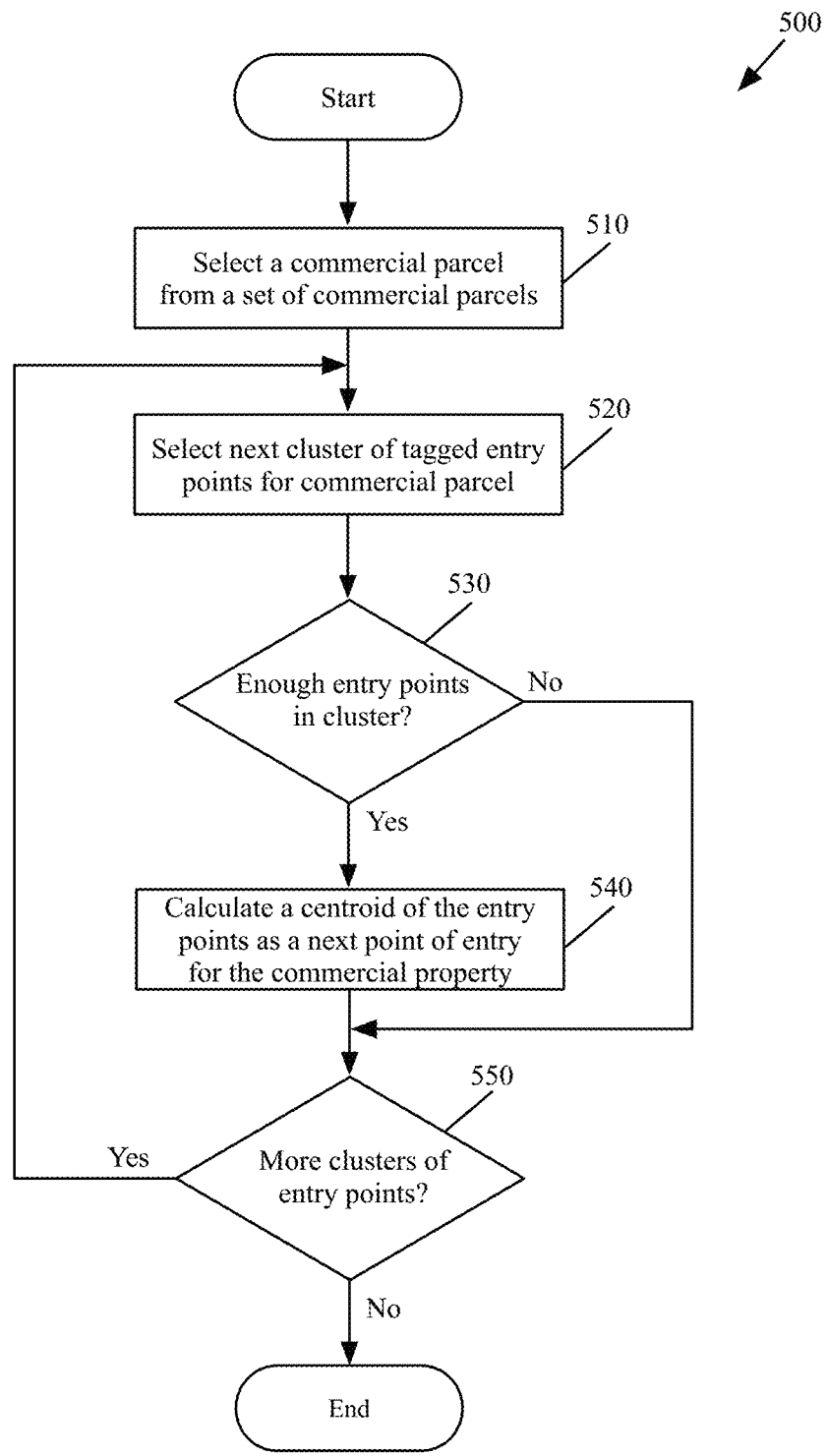
FIG. 5 conceptually illustrates a process of some embodiments for identifying an accurate vehicle point of entry for a commercial property (to be shown on a map presentation) based on a cluster of tagged entry points.

FIG. 5 conceptually illustrates a process 500 of some embodiments for identifying an accurate vehicle point of entry for a commercial property (to be shown on a map presentation) based on a cluster of tagged entry points. In some embodiments, the process is performed by a dedicated map entry server (service) that provides the entry points database for commercial properties to other harvesting servers, while in some other embodiments, the process 500 is performed by a map server that provides mapping and navigation services to different users. An identical process identifies the exit points for a commercial property. In some embodiments, the only difference between a process that identifies the accurate exit points for a commercial property and a process that identifies the accurate entry points for the commercial property is that the former analyzes exit point clusters, while the latter analyzes entry point clusters.

The process starts by selecting (at 510) a commercial parcel from a set of commercial parcels. The process then selects (at 520) the next cluster (e.g., a first cluster if this is the first time that the process is performed) of tagged entry points. In some embodiments, the process uses a known clustering algorithm (e.g., a cluster analysis algorithm that identifies closely spaced groups within a data set) to identify each cluster of tagged entry points. The tagged entry points for a commercial property are generated by a process similar to process 300 described above by reference to FIG. 3. That is, for each probe trace that process 300 finds an entry point, the process tags the entry point as a candidate entry point of a cluster. As described above by reference to FIG. 2, a commercial property may have multiple entry points and therefore a separate cluster of tagged entry points is generated for each entry.

After selecting the next cluster of entry points, the process determines (at 530) whether there are enough tagged entry points in the selected cluster. Some embodiments, as discussed above, forgo identifying an accurate point of entry for a cluster of tagged entry points, when the number of entry points in the cluster is less than a threshold value (e.g., less than 5% of the total number of probe entry points of all clusters). As such, when the process determines that the number of tagged entry points in the selected cluster is not enough (i.e., is less than a predefined value), the process proceeds to operation 550, which is described below.

On the other hand, when the process determines that the number of tagged entry points in the selected cluster is enough (i.e., is more than a threshold), the process calculates (at 540) a centroid of the entry points in the cluster. As stated above, the centroid is calculated based on different algorithms in different embodiments, and is not necessarily the center of the entry points in the selected cluster. After calculating the centroid (and storing it in a database), the process of some embodiments determines (at 550) whether any more cluster of entry points exists to examine or not. If the process determines that no more clusters are left, the process ends. On the other hand, if the process determines that there are more clusters of entry points, the process returns to operation 520 to select the next cluster and performs the other described operations accordingly.

Some embodiments perform variations of the process 500. The specific operations shown and described for this figure may not be performed in one continuous series of operations, and different specific operations may be performed in different embodiments. Additionally, the specific operations shown and described for this figure may not be performed in one continuous series of operations, and different specific operations may be performed in different embodiments. Furthermore, the process 500 could be implemented using several sub-processes, or as part of a larger macro process.

After one or more entries to an enclosed area associated with a POI are discovered, some embodiments identify one or more entrances (doors) to a building associated with the POI. That is, some embodiments trace a walking path of the GPS enabled mobile device from a stop point, at which a corresponding vehicle is considered to be parked, to one or more entrances of the building. Some embodiments identify the entrances to a building by determining that a set of walking probe traces, attached to a subset of terminated driving probe traces, converge at a particular area of the building and diverge afterwards. Some embodiments examine all walking probe traces that intersect with a building footprint associated with a commercial parcel, irrespective of the walking probe traces being attached to a driving probe trace or not. As mentioned, these additional walking probe traces may be attached to a transit trip or be completely independent of other traces.

After identifying one or more vehicle points of entry for a commercial parcel, some embodiments determine whether the commercial parcel is associated with a building footprint. After determining that one or more building footprints are associated with the commercial parcel (e.g., based on commercial parcels data and building footprints data), these embodiments start analyzing the walking paths that are attached to some or all of the driving paths that ended in the commercial parcel. Not all of the driving probe traces that terminate at the parking garage are associated with a walking probe trace that leads to a building door.

For example, some users close all of the applications that run on the device and turn the device off when the driving is terminated (some embodiments, as described above, still generate walking probe traces for a specific period of time).

Additionally, a walking probe trace may not be generated when the battery life of the device is below a certain percentage. For the rest of driving probe traces that have a walking probe trace attached to them, some embodiments identify each convergence area of the probes at a particular area of the building by determining that the walking probe traces intersect with a footprint of the building at the particular area. The convergence areas are indicative of points of entry to the building.

Figure 6:
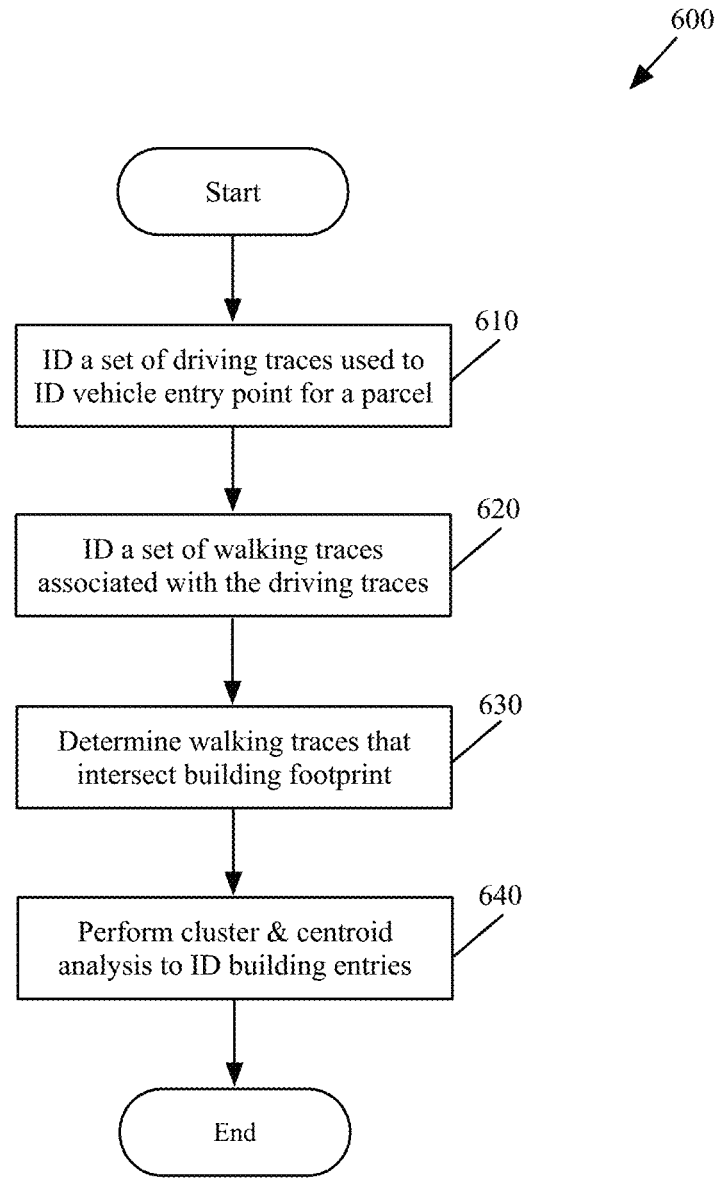
FIG. 6 conceptually illustrates a process of some embodiments that analyzes a subset of walking paths attached to a set of driving paths ended at a parking facility in order to identify entry points to a building associated with the parking facility.

FIG. 6 conceptually illustrates a process 600 of some embodiments that analyzes a subset of walking paths attached to a set of driving paths ended at a parking facility, in order to identify entry points to a building associated with the parking facility. This process is performed by a server that provides map related services to one or more harvesting servers in some embodiments. In some other embodiments, this process is performed by one or more modules of a map server that provides mapping and navigation services to different users.

Although process 600 examines a set of walking probe traces that are attached to driving probe traces, some embodiments examine and analyze all walking probe traces that intersect a building footprint associated with a commercial parcel, including those independent of driving probe traces. That is, in some embodiments, the harvesting server receives all of the walking probe traces within a parcel polygon (whether attached to a driving probe trace or not) and determines whether the walking probe traces intersect a building footprint in order to identify entrances to the building.

The process starts (at 610) by identifying a set of driving traces that is used to identify a set of one or more vehicle entry points for a commercial parcel. The process then identifies (at 620) a subset of the identified driving traces, to each of which, a walking path is attached. As described above, not every driving probe trace has a walking trace attached to it. Additionally, not every walking probe trace that is attached to a driving probe trace ends up in a commercial building that is associated with the parking lot. For example, a driver might park his car in a parking lot and walk for a little distance and turn his mobile device off before reaching any particular structure.

Therefore, the process determines (at 630) which walking probe traces in the subset intersect with a building footprint. When the process identifies all the walking probe traces that intersect with the building footprint, the process performs (at 640) the required cluster and centroid analyses (similar to cluster and centroid algorithms described above by reference to FIG. 5) in order to identify proper points of entry (e.g., doors) for the building. The process then ends.

Some embodiments perform variations of the process 600. The specific operations shown and described for this figure may not be performed in one continuous series of operations, and different specific operations may be performed in different embodiments. Furthermore, the process 600 could be implemented using several sub-processes, or as part of a larger macro process. For example, after identifying the set of walking probe traces that are qualified for further analysis, the operations 630 and 640 could be implemented by a different process 700 that is described below by reference to FIG. 7.

In some embodiments, the map service receives building footprints associated with the commercial parcel polygons from one or more third-party vendors. The building footprints are mapped to commercial parcels in order to identify which buildings are associated with each parcel polygon. This way, when several different buildings (of different POIs) are associated with the same parking lot, convergence of a set of walking paths in front of each building's footprint is indicative of an entrance to that building. In some other embodiments, the acquired parcel polygons include the POIs associated with the polygons and no mapping of the building footprints on the parcel polygons is required.

Figure 7:
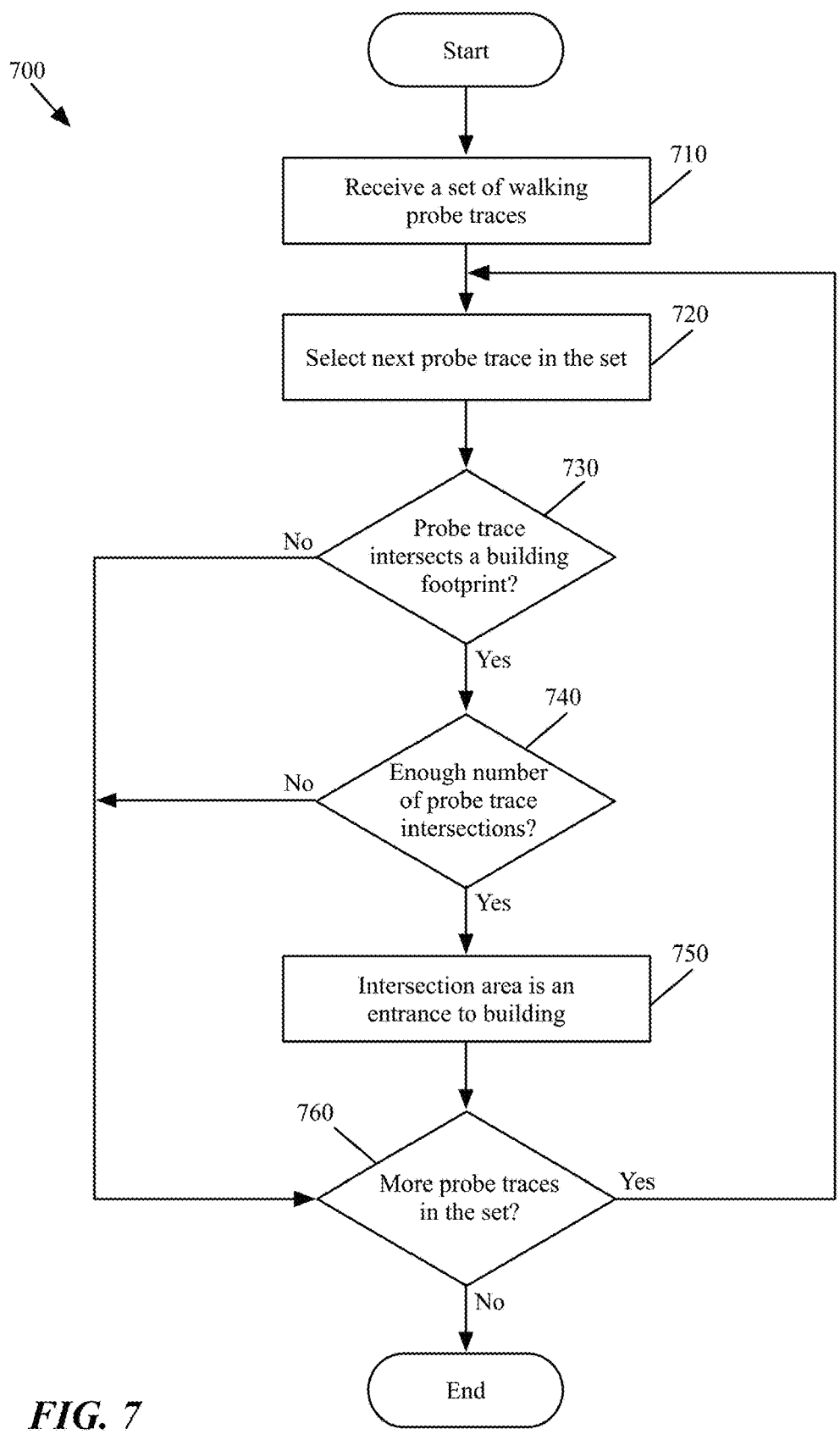
FIG. 7 conceptually illustrates a process of some embodiments that identifies one or more entry points to a building associated with a POI.

FIG. 7 conceptually illustrates a process 700 of some embodiments that identifies one or more entry points to a building associated with a POI. This process is performed by a server that provides map related services to one or more harvesting servers in some embodiments. In some other embodiments, this process is performed by one or more modules of a map server that provides mapping and navigation services to different users.

The process starts (at 710) by receiving a set of walking probe traces which defines walking paths of a set of mobile devices. As mentioned, in different embodiments the walking probe traces in the set may include traces that are attached to driving probe traces, traces attached to transit probe traces, and/or traces that are separate from driving or transit probe traces. The process receives the set of walking probe traces through different means (e.g., cell towers and base stations, etc.) from a set of mobile devices that has recorded these traces while being carried by a user. In some embodiments, the process receives the walking probe traces from the output generated by the process 300 described above by reference to FIG. 3. That is, the process uses the candidate probes identified by process 300 and determines which one of these candidate probes has a walking probe trace attached to its driving probe trace. In some other embodiments, process 700 receives the set of candidate walking probe traces directly from operation 620 of the process 600, described above by reference to FIG. 6.

After receiving the probe traces, the process selects (at 720) the first probe trace in the set. The process then determines (at 730) whether the walking probe trace intersects with a building footprint within the parcel polygon. If the process determines that the probe trace does not intersect with the footprint, the process determines (at 760) whether there are any more walking traces left to analyze. If the process determines that no more trace has left in the set, the process ends. On the other hand, if the process determines that there are more traces to analyze, the process returns to operation 720 to select the next probe trace and perform the analysis on the newly selected probe trace.

When the process determines (at 730) that at some point, the probe trace intersects with a building footprint associated with the parcel polygon, the process marks the intersection point as a potential entrance to the building. At 740, the process determines whether there are enough number of probe traces that intersect with the building footprint at a particular location. That is, the process determines whether enough number of probe traces, collected over a particular period of time, intersect with the building footprint at or around a particular location (i.e., a particular building entrance).

When the process determines that there is not enough number of walking probe traces that intersect with the building footprint, the process proceeds to operation 760 to either select the next probe trace, if there are more probe traces left in the set, or to end, if no more walking probe traces are left in the set. On the other hand, when the process determines that enough number of walking probe traces are identified that intersect with the building footprint at or around a particular location, the process identifies the intersection point as one of the points of entry to the building.

The process then determines (at 760) whether there are more probe traces to examine. This is because, a building might have several different entrances, with each of which, a different cluster of walking probe traces intersects. As such, the process continues to examine the walking probe traces until all possible entrances to a building are identified. Similarly, a commercial parcel might be associated with more than one buildings. Therefore, some embodiments perform a similar process to identify all of the entrances for all of the buildings. When the process determines that no more probe trace has left in the candidate set of traces, the process ends. On the other hand, when the process determines that more probe traces are available to examine the process returns to operation 720 to select the next walking probe trace from the set of candidate probe traces.

Some embodiments perform variations of the process 700. The specific operations shown and described for this figure may not be performed in one continuous series of operations, and different specific operations may be performed in different embodiments. Furthermore, the process 700 could be implemented using several sub-processes, or as part of a larger macro process.

As with any other crowd sourced data collection, a few inaccurate entrance points may be calculated due to the existence of various sources of error. Some of these sources include, GPS errors, inaccurate or incorrect parcel boundary polygon shape, and inaccurate or incorrect road network data (e.g., bad road shapes or bad road attributes). For inaccurate parcel data and/or road data not much can be done, except reporting the errors to the data providers to correct the errors. However, in order to reduce errors in identification of entrance points caused by other reasons, some embodiments apply different filters to the produced data set. In other words, because location data collected from a set of mobile devices over a period of time is based on statistical data, occasionally, this data tends to produce inaccurate results. In order to raise the level of accuracy, some embodiments utilize various filtering mechanisms.

For instance, in some embodiments, if the map service determines that an identified point of entry to a parking lot is too far away from the POI (i.e., the distance between the parking entrance and the building associated with the requested address is beyond a threshold), the map service disregards the point of entry as a parking entrance associated with the POI. As another example, when an enclosed area is larger than a predefined area and has several identified points of entry, the map service disregards the identified points of entry (i.e., does not store the points of entry in the points of entry database).

Relative traffic associated with each calculated point of entry is another filter in some embodiments. Entrances with a relative traffic that is too low, compared to the overall traffic, or compared to the highest traffic entrance are removed in some embodiments. Additionally, entrances calculated from clusters with less than a particular number of probe traces are also dropped in some embodiments. The time period over which the probes are analyzed also can have a source of filtering in some embodiments. For example, for probe traces that are collected within a particular period of time (e.g., 12 months), any entrance with number of one or two probe traces for only a fraction of the particular time period are also dropped (e.g., only one available probe trace per month for only two months out of the 12 months).

Figure 8:
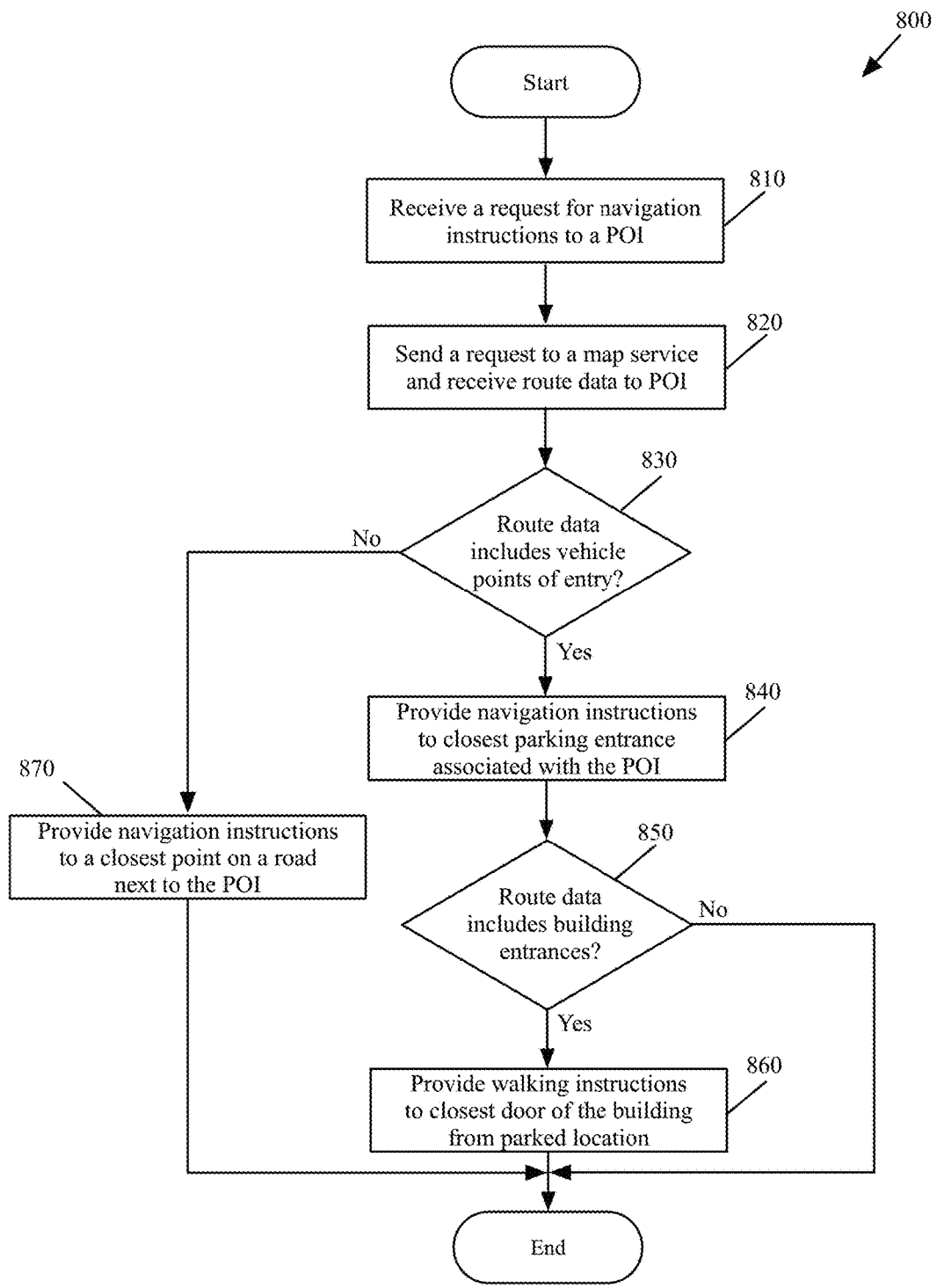
FIG. 8 conceptually illustrates a process that receives a request for navigation instructions to a POI and provides driving instructions to a closest parking entrance, as well as walking instructions to a closest door of a building, associated with the POI.
Figure 9:
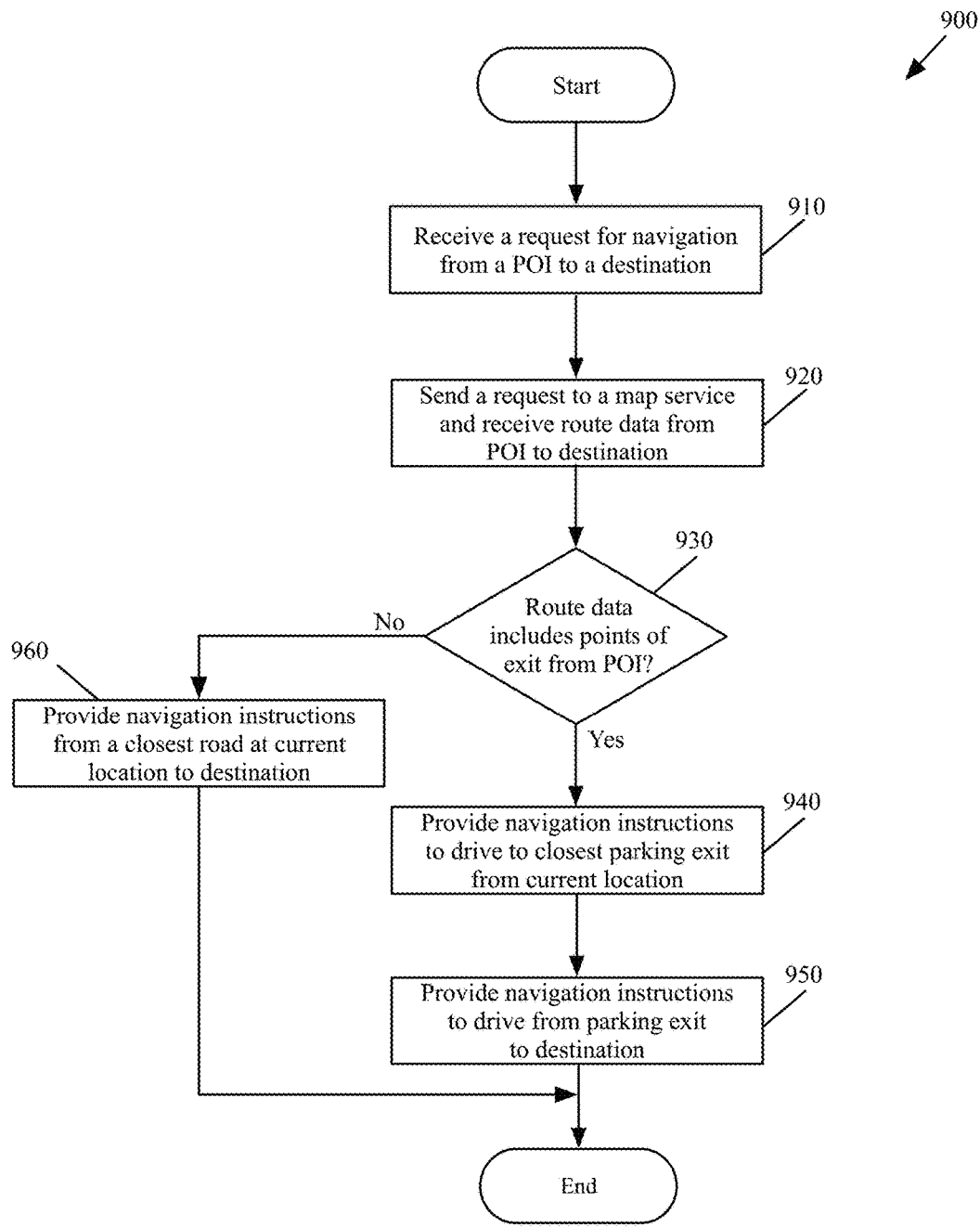
FIG. 9 conceptually illustrates a process that receives a request for navigation instructions from a POI to a destination, and provides driving instructions to a closest parking exit associated with the POI and then to the destination.

Different aspects of a map service (server) or an exit/entrance finding application that a map service of some embodiments uses is described above. Below, a navigation application of some embodiments that uses this map service to provide navigation instructions to a user is described by reference to FIGS. 8 and 9. Specifically, FIG. 8 illustrates a navigation application that provides driving instructions to a parking entrance of a POI (e.g., a movie theatre, a stadium, a convention center, an airport, etc.), and subsequently (after a user parked his vehicle in the parking), provides walking instructions to a door of a building associated with the POI. FIG. 9 then describes how a navigation application provides driving instructions (from a location at which a user's vehicle is parked) to a closest parking exit, and subsequently, to a requested destination.

FIG. 8 conceptually illustrates a process 800 of some embodiments, which receives a request for navigation instructions to a POI, and provides driving instructions to a closest parking entrance, as well as walking instructions to a closest door of a building, associated with the POI. The process 800 is performed by a navigation application that runs on an electronic device (e.g., a mobile device such as a mobile phone, a laptop, etc.) in some embodiments.

The process starts by receiving (at 810) a request for navigation instructions to a point of interest (POI). For instance, a user provides the name or address of a museum (by typing the name, speaking the name, etc.) to the navigation application (e.g., executing on a mobile device of a user) and requests navigation instructions to the museum. The navigation application, upon receiving the request, identifies the current location of the device (e.g., through a GPS sensor) and sends a request (at 820) to a map service for route data from the current location of the device to the requested POI. The map service, as described in great detail above, calculates one or more navigation routes from the current location to the point of interest and generates the required route data for the calculated routes to send to the navigation application.

In some embodiments, the map service includes, in the generated route data, a closest point of entry (from the current location of the device) to a parking facility or structure that is associated with the POI. In some embodiments, the map service also includes walking instructions to the closest door of a building associated with the POI. In some embodiments, the navigation application and map service establish a communication channel between each other and the route data is transferred to the navigation application online. In some other embodiments, the route data is transferred to the navigation application based on the occurrence of a certain event.

For example, in some embodiments, depending on where the user parks his vehicle in the parking facility, the map service provides a proper set of walking data (from the parked location to the nearest door) to the navigation application. In some other embodiments, the map service includes all of the points of entry's data in the route data provided to the navigation application, and the navigation application, based on the location of the device, calculates the right driving and/or walking instructions.

After the process 800 receives the route data from the map service, the process determines (at 830) whether the received route data includes any vehicle point of entry to a parking facility associated with the POI. When the process determines that no vehicle point of entry to a parking facility associated with the POI is included in the route data, the process generates (at 870) a set of navigation instructions to drive to a nearest location to the POI (e.g., a centroid on a public road next to the POI) and provides the set of instructions to the user. The process then ends.

On the other hand, when the process determines that one or more vehicle points of entry to a parking facility associated with the POI is included in the route data, the process generates (at 840) a set of navigation instructions to drive to a nearest vehicle point of entry to the parking facility (i.e., the nearest entrance to the POI on the driving path of the device). The navigation application then provides the generated set of instructions to the user as the user drives towards the POI.

When the navigation application realizes that the vehicle is parked in the parking structure (e.g., through a motion sensor and/or any other sensor of the device), the navigation application determines (at 850) whether the route data received from the map service includes any walking point of entry (e.g., a door) to a building associated with the POI. When the process determines that no entrance to a building associated with the POI is included in the route data, the process ends. That is, when the vehicle stops and no walking instruction data is received from the map service, the navigation application finishes the instructions and informs the user that the POI is reached.

On the other hand, when the process determines that one or more entrances to a building associated with the POI is included in the route data, the navigation application generates (at 860) a set of walking instructions from the vehicle's parked location to a nearest point of entry to the building (i.e., the nearest door of the building from the parked spot in the parking facility). The navigation application then provides the generated set of walking instructions to the user as the user walks towards the building. The process then ends.

Some embodiments perform variations of the process 800. The specific operations shown and described for this figure may not be performed in one continuous series of operations, and different specific operations may be performed in different embodiments. For example, in some embodiments the process 800 does not generate the instructions based on the route data received from the map service. In some such embodiments, instead of the route data, the process receives the instructions (i.e., driving and/or walking instructions) from the map service and simply provides the received instructions to the user. Furthermore, the process 800 could be implemented using several sub-processes, or as part of a larger macro process.

FIG. 9 conceptually illustrates a process 900 of some embodiments, which receives a request for navigation instructions from a POI to a destination, and provides driving instructions to a closest parking exit associated with the POI and subsequently to the destination. The process 900 is performed by a navigation application that runs on an electronic device (e.g., a mobile device such as a mobile phone, a laptop, etc.) in some embodiments.

The process starts by receiving (at 910) a request for navigation instructions from a point of interest (POI) to a destination. For instance, a user who has visited a POI, provides the name or address of a destination (by typing the name or address, speaking the name or address, etc.) to the navigation application (e.g., executing on a mobile device of a user) and requests navigation instructions to the destination.

The navigation application, upon receiving the request, identifies the current location of the device (e.g., which is at a POI) and sends a request (at 920) to a map service for route data from the current location of the device to the requested destination. The map service, as described in great detail above, calculates one or more navigation routes from the current location to the point of interest and generates the required route data for the calculated routes to send to the navigation application.

In some embodiments, the map service includes, in the generated route data, a closest exit point (from the current location of the device) of a parking facility or structure that is associated with the POI. In some embodiments, the navigation application and map service establish a communication channel between each other and the route data is transferred to the navigation application online or based on occurrence of an event. In some other embodiments, the map service includes all of the points of entry's data in the route data provided to the navigation application, and the application, based on the location of the device, calculates the right driving and/or walking instructions.

After the process 900 receives the route data from the map service, the process determines (at 930) whether the received route data includes any exit point from the parking facility in which the vehicle is parked. When the process determines that no vehicle exit point from the parking facility associated with the POI is included in the route data, the navigation application generates (at 960) a set of navigation instructions from a closest road (e.g., on the public road data) at the current location of the device to the destination and provides the set of instructions to the user. The process then ends.

On the other hand, when the process determines that one or more exit points from the parking facility associated with the POI is included in the route data, the navigation application generates (at 940) a set of navigation instructions to drive to a nearest exit point from the parking facility (i.e., the nearest exit of the parking lot from where the vehicle is parked). The navigation application then provides the generated set of instructions to the user as the user drives on the private roads of the POI towards the exit.

When the navigation application realizes that the vehicle has left the parking structure (e.g., when the vehicle has left the private road associated with the POI and entered a public road), the navigation application provides (at 950) driving instructions to the final destination, as the vehicle drives on the public roads towards the destination.

Some embodiments perform variations of the process 900. The specific operations shown and described for this figure may not be performed in one continuous series of operations, and different specific operations may be performed in different embodiments. For example, in some embodiments the process 900 does not generate the instructions based on the route data received from the map service. In some such embodiments, instead of the route data, the process receives the instructions (i.e., driving instructions) from the map service and simply provides the received instructions to the user. Furthermore, the process 900 could be implemented using several sub-processes, or as part of a larger macro process.

II. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 10:
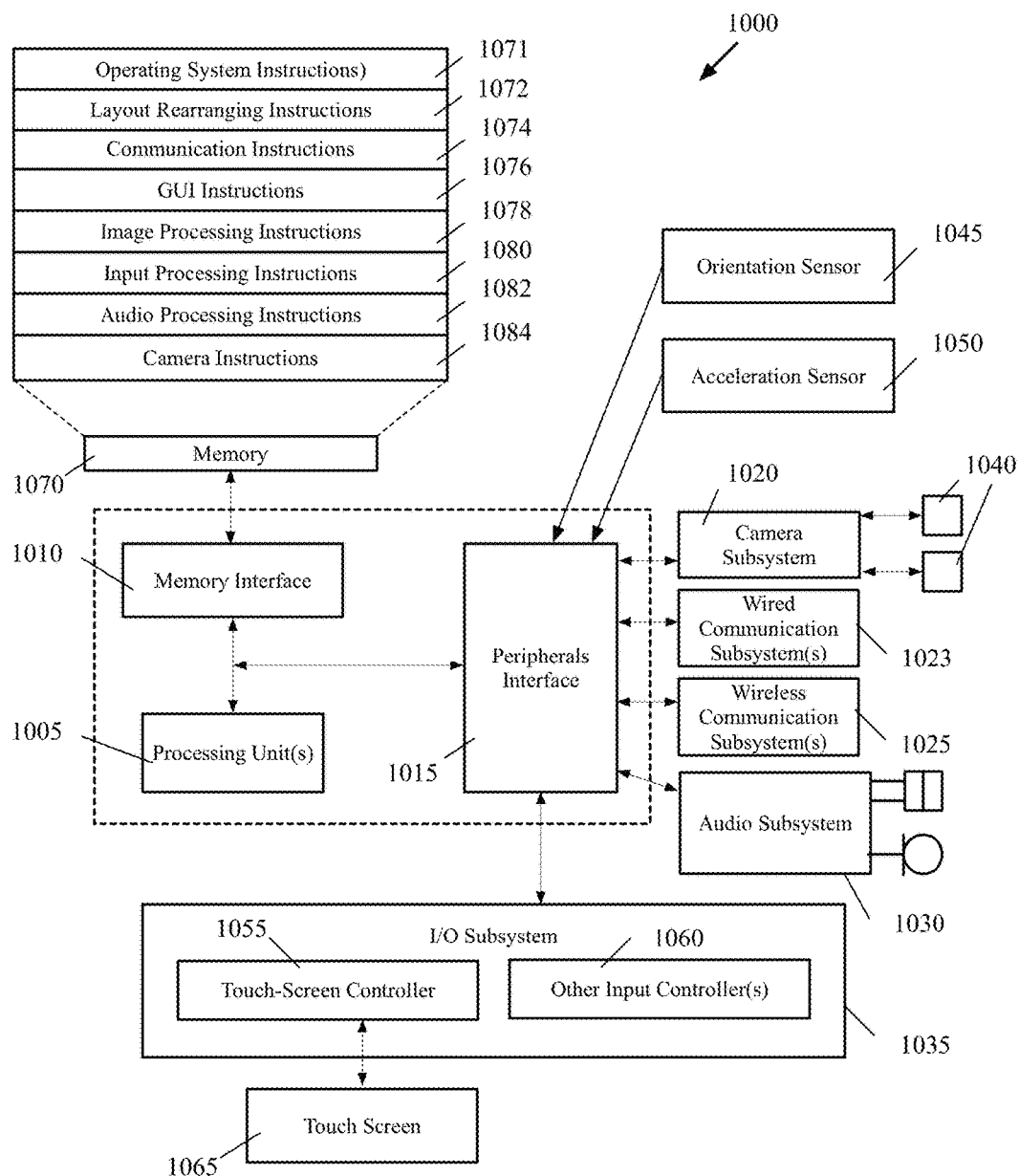
FIG. 10 illustrates an example of an architecture of a mobile computing device of some embodiments.

The applications of some embodiments operate on mobile devices, such as smart phones (e.g., iPhones®) and tablets (e.g., iPads®). FIG. 10 illustrates an example of an architecture 1000 of such a mobile computing device. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wired communication subsystem(s) 1023, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wired communication subsystem 1023 and wireless communication subsystem 1025 serve to facilitate communication functions.

In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output voice navigation instructions). Additionally, the audio subsystem 1030 is coupled to a microphone to facilitate voice-enabled functions in some embodiments.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen

1065 using any of multiple touch sensitivity technologies. The other input controllers 1060 are coupled to other input/ control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1071. The OS 1071 includes instructions for handling basic system services and for performing hardware dependent tasks. The memory 1070 additionally includes layout rearranging instructions 1072 in order for the device 1000 to perform the layout rearranging process of some embodiments. In some embodiments, these instructions 1072 may be a subset of the operating system instructions 1071, or may be part of the instructions for an application.

The memory 1070 also includes communication instructions 1074 to facilitate communicating with one or more additional devices (e.g., for peer-to-peer data sharing, or to connect to a server through the Internet for cloud-based data sharing); graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

B. Computer System

Figure 11:
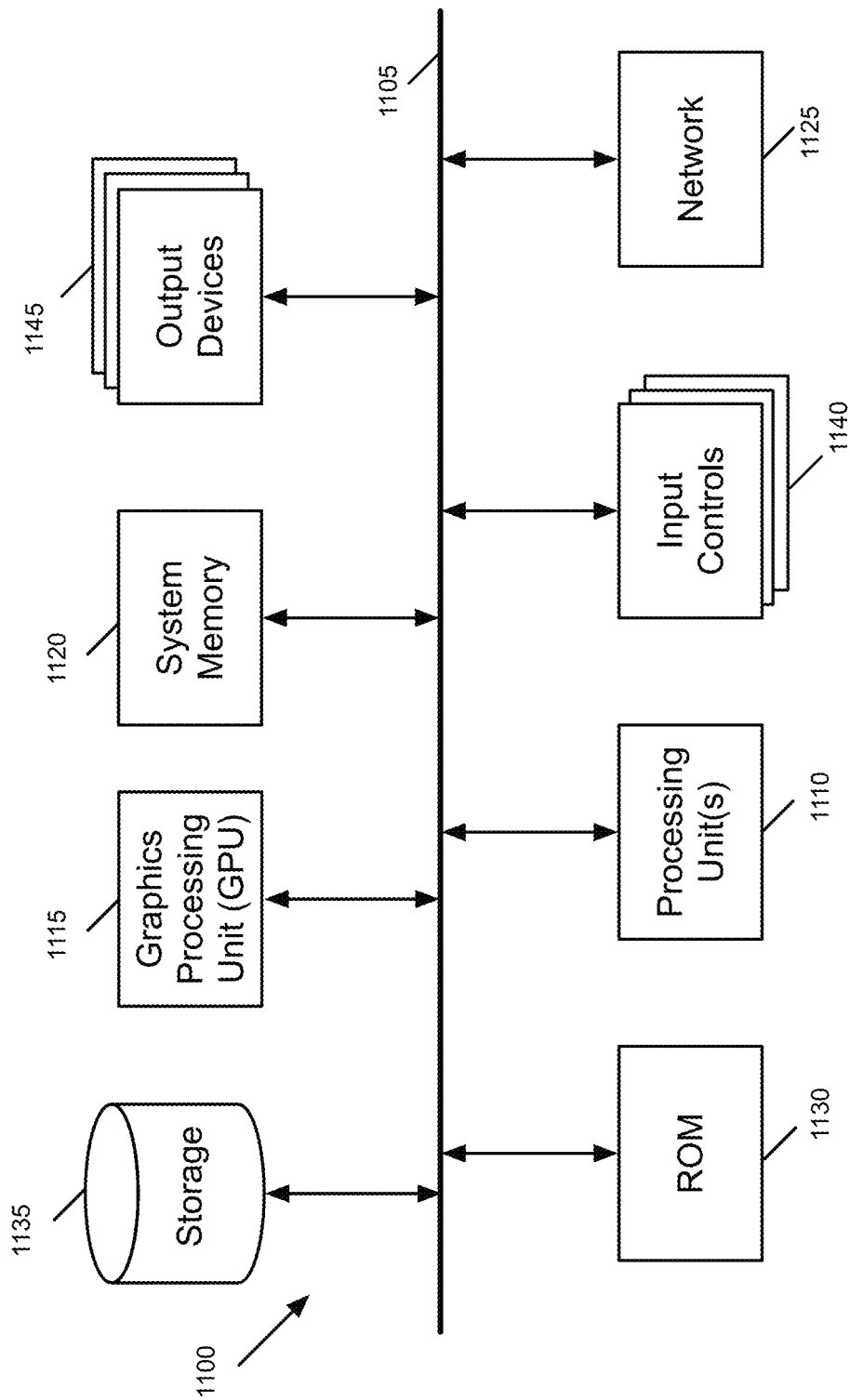
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet), or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 3-9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

III. Map Service

Figure 12:
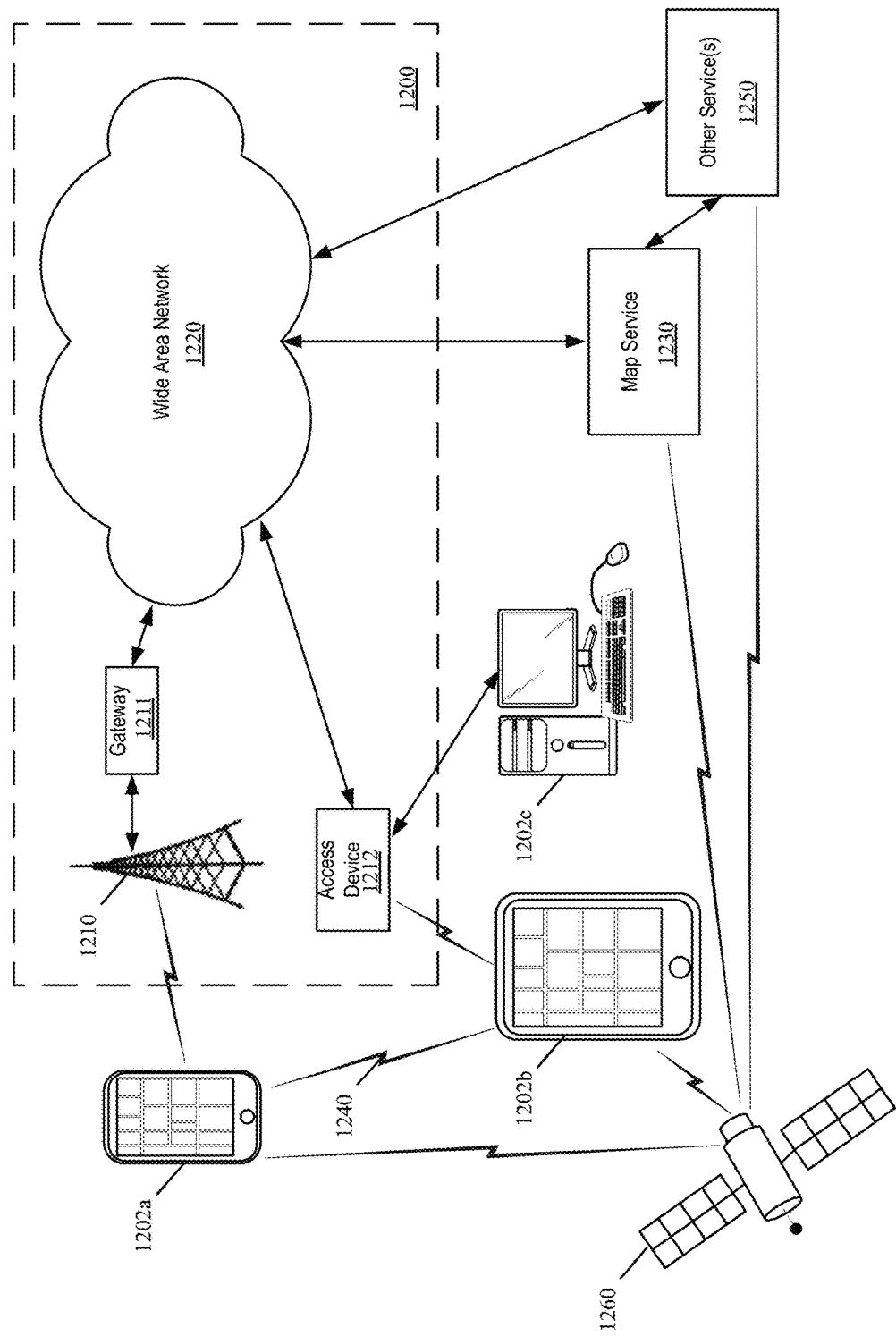
FIG. 12 illustrates one possible embodiment of an operating environment for a map service (also referred to as a mapping service) and client devices.

Various embodiments may operate within a map service operating environment. FIG. 12 illustrates one possible embodiment of an operating environment 1200 for a map service (also referred to as a mapping service) 1230 and client devices 1202a-1202c. In some embodiments, devices 1202a, 1202b, and 1202c communicate over one or more wired or wireless networks 1210. For example, wireless network 1210, such as a cellular network, can communicate with a wide area network (WAN) 1220, such as the Internet, by use of gateway 1214. A gateway 1214 in some embodiments provides a packet oriented mobile data service, such as General Packet Radio Service (GPRS), or other mobile data service allowing wireless networks to transmit data to other networks, such as wide area network 1220. Likewise, access device 1212 (e.g., IEEE 802.11g wireless access device) provides communication access to WAN 1220.

The client devices 1202a and 1202b can be any portable electronic or computing device capable of communicating with a map service (e.g., smart phone, tablet, laptop computer, etc.). Device 1202c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1202a-1202c are not shown as each accessing the map service 1230 via either the wireless network 1210 and gateway 1214 or the access device 1212, one of ordinary skill in the art will recognize that the client devices of some embodiments may access the map service via multiple different wired and/or wireless protocols.

Devices 1202a-1202c can also establish communications by other means. For example, these devices may communicate with other wireless devices (e.g., other devices 1202b, cell phones, etc.) over the wireless network 1210 or through access device 1212. Likewise, the devices 1202a-1202c can establish peer-to-peer communications 1240 (e.g., a personal area network) by use of one or more communication subsystems, such as Bluetooth® communication or similar peer-to-peer protocols.

Devices 1202a-1202c may also receive Global Positioning Satellite (GPS) signals from GPS satellites 1260. In addition, in some embodiments the map service 1230 and other services 1250 may also receive GPS signals from GPS satellites 1260.

A map service 1230 may provide map services for one or more client devices 1202a-1202c in communication with the map service 1230 through various communication methods and protocols. A map service 1230 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1202a-1202c may utilize these map services to obtain the various map service data, then implement various techniques to process the data and provide the processed data to various entities (e.g., internal software or hardware modules, display screens of the client devices, external display screens, or other external systems or devices.

The map service 1230 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1202a-1202c, the map service 1230 of some embodiments, performs various optimization techniques to analyze a map tile before encoding the tile.

In some embodiments, the map tiles are generated by the map service 1230 for different possible display resolutions at the client devices 1202a-1202c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1230 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1230 responds to requests from the client devices 1202a-1202c for map information. The client devices may request specific portions of a map, or specific map tiles (e.g., specific tiles at specific zoom levels). In some embodiments, the client devices may provide the map service with starting locations (or current locations) and destination locations for route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1202a-1202c that obtain map service data from the map service 1230 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1202a-1202c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1230. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1202a-1202c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1230 and/or other service(s) 1250 are configured to process search requests from any of the client devices. Search requests may include but are not limited to queries for businesses, addresses, residential locations, points of interest, or some combination thereof. Map service 1230 and/or other service(s) 1250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1230 and/or other service(s) 1250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1230 and/or other service(s) 1250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1230 and/or other service(s) 1250 provide one or more feedback mechanisms to receive feedback from client devices 1202*a*-1202*c*. For instance, client devices may provide feedback on search results to map service 1230 and/or other service(s) 1250 (e.g., feedback specifying ratings, reviews, temporary or permanent business closures, errors etc.); this feedback may be used to update information about points of interest in order to provide more accurate or more up-to-date search results in the future. In some embodiments, map service 1230 and/or other service(s) 1250 may provide testing information to the client device (e.g., an A/B test) to determine which search results are best. For instance, at random intervals, the client device may receive and present two search results to a user and allow the user to indicate the best result. The client device may report the test results to map service 1230 and/or other service(s) 1250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

We claim:

1. A method implemented by a server computing device, the server computing device comprising one or more processors and a memory device, the method for identifying entry points to a point of interest, the method comprising:
   collecting location data from a plurality of devices wherein the location data indicates a driving path of a subset of the plurality of devices;
   determining that driving paths of the subset terminate at a particular location within a vicinity of a building associated with the particular location;
   identifying that a walking path for each device in the subset from the particular location intersects with the building at a particular area of the building; and
   identifying the particular area as a point of entry to the building.

2. The method of claim 1, wherein the particular location is a parking garage for the building.

3. The method of claim 1 further comprising, before determining that a driving path of a device in the subset of devices terminates at the particular location, determining that the driving path branches off a public road network to a private road associated with the particular location.

4. The method of claim 3 further comprising, after determining that the driving path of the device terminates, tracing back the driving path to the public road network from where the driving path terminates.

5. The method of claim 4 further comprising determining whether the driving path, after meeting the public road network, is further traceable on a public road beyond a threshold distance.

6. The method of claim 5 further comprising, when the driving path is further traceable on the public road, identifying, in the back traced driving path, a point at which the private road meets the public road network as a vehicle point of entry for the particular place.

7. The method of claim 4, wherein the backward tracing comprises a customized map matching algorithm which uses a set of road attributes as input.

8. The method of claim 1, wherein the driving path of a device in the subset of devices is determined to be terminated when a traveling speed of the device falls below a predetermined value.

9. The method of claim 1 further comprising:
   receiving a request for directions to the building; and
   generating a set of navigation instructions for navigating up to the point of entry of the building.

10. The method of claim 9, wherein the set of navigation instructions comprises:
    a subset of driving instructions for entering the particular area; and
    a subset of walking instructions for entering the building.

11. The method of claim 1, wherein the vicinity of the building comprises a threshold distance from the building.

12. The method of claim 1, wherein the particular location is defined by a commercial parcel polygon.

13. The method of claim 12, wherein the building is defined by a building footprint that is within the commercial parcel polygon.

14. A non-transitory machine readable medium storing an entry service application for identifying entry points to a point of interest, the entry service application executable by at least one processing unit of a server computing device, the entry service application comprising sets of instructions for:
- collecting location data from a plurality of devices wherein the location data indicates a driving path of a subset of the plurality of devices;
- determining that driving paths of the subset terminate at a particular location within a vicinity of a building associated with the particular location;
- identifying that a walking path for each device in the subset from the particular location intersects with the building at a particular area of the building; and
- identifying the particular area as a point of entry to the building.

15. The non-transitory machine readable medium of claim 14, wherein the particular location is a parking garage for the building.

16. The non-transitory machine readable medium of claim 14, wherein the program further comprises a set of instructions for, before determining that a driving path of a device in the subset of devices terminates at the particular location, determining that the driving path branches off a public road network to a private road associated with the particular location.

17. The non-transitory machine readable medium of claim 16, wherein the program further comprises a set of instructions for, after determining that the driving path of the device terminates, tracing back the driving path to the public road network from where the driving path terminates.

18. The non-transitory machine readable medium of claim 17, wherein the program further comprises a set of instructions for determining whether the driving path, after meeting the public road network, is further traceable on a public road beyond a threshold distance.

19. The non-transitory machine readable medium of claim 18, wherein the program further comprises a set of instructions for, when the driving path is further traceable on the public road, identifying, in the back traced driving path, a point at which the private road meets the public road network as a vehicle point of entry for the particular place.

20. The non-transitory machine readable medium of claim 14, wherein the program further comprises sets of instructions for:
- receiving a request for directions to the building; and
- generating a set of navigation instructions for navigating up to the point of entry of the building.

21. The non-transitory machine readable medium of claim 20, wherein the set of navigation instructions comprises a subset of driving instructions for entering the particular area and a subset of walking instructions for entering the building.

* * * * *